United States Patent
Halabian et al.

(10) Patent No.: US 11,374,852 B2
(45) Date of Patent: Jun. 28, 2022

(54) PIECEWISE SHORTEST PATH FIRST ROUTING

(71) Applicants: Hassan Halabian, Kanata (CA); Mehdi Arashmid Akhavain Mohammadi, Ottawa (CA)

(72) Inventors: Hassan Halabian, Kanata (CA); Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/888,023

(22) Filed: May 29, 2020

(65) Prior Publication Data

US 2021/0377151 A1 Dec. 2, 2021

(51) Int. Cl.
*H04L 45/12* (2022.01)
*H04L 45/00* (2022.01)
(Continued)

(52) U.S. Cl.
CPC ....... *H04L 45/126* (2013.01); *H04B 7/18513* (2013.01); *H04L 45/028* (2013.01); *H04L 45/04* (2013.01); *H04W 40/20* (2013.01)

(58) Field of Classification Search
CPC ..... H04L 45/126; H04L 45/04; H04L 45/028; H04W 40/20; H04B 7/18513
See application file for complete search history.

(56) References Cited

U.S. PATENT DOCUMENTS 5,930,348 A * 7/1999 Regnier ............... H04Q 3/0029
379/221.01
6,147,980 A 11/2000 Yee et al.
(Continued)

FOREIGN PATENT DOCUMENTS

CN 1681257 A 10/2005
CN 101119372 A 2/2008
(Continued)

OTHER PUBLICATIONS

Edoardo Benzi et al "Optical Inter-Satellite Communication: the Alphasat and Sentinel-1A in-orbit experience"; SpaceOps Conferences, May 16-20, 2016, Daejeon, Korea; 14th International Conference on Space Operations.
(Continued)

*Primary Examiner* — Jianye Wu

(57) ABSTRACT

A method and apparatus for routing packets in a network, such as a satellite mesh network. Geographic routing is employed in which packets specify their physical destination location. Network nodes maintain physical location information for nodes, along with routing information, for a limited portion of the network which is local thereto. At each node and for each packet, a target node is selected from the limited portion. The target node may be the node which is closest in orthodromic distance to the physical destination location. Based on the routing information, a route through the limited portion of the network to the target node is determined, other nodes are configured (e.g. via source routing) to cause the packet to traverse the determined route, and the packet is forwarded toward the target node.

22 Claims, 13 Drawing Sheets

400

(51) Int. Cl.
*H04W 40/20* (2009.01)
*H04B 7/185* (2006.01)
*H04L 45/028* (2022.01)
*H04L 45/02* (2022.01)

(56) References Cited

U.S. PATENT DOCUMENTS

| | | | |
|---|---|---|---|
| 6,208,295 | B1 | 3/2001 | Dogan |
| 6,804,199 | B1 | 10/2004 | Kelly et al. |
| 6,816,460 | B1 * | 11/2004 | Ahmed .............. H04L 45/04 370/238 |
| 7,613,121 | B2 | 11/2009 | Chou |
| 7,945,272 | B2 | 5/2011 | Kim |
| 10,796,251 | B2 | 10/2020 | Mason, Jr. et al. |
| 2005/0152333 | A1 | 7/2005 | Smith |
| 2005/0198286 | A1 | 9/2005 | Xu |
| 2006/0218225 | A1 | 9/2006 | Hee Voon et al. |
| 2007/0147254 | A1 | 6/2007 | Larsson |
| 2007/0239349 | A1 | 10/2007 | Ohnishi et al. |
| 2009/0046732 | A1 * | 2/2009 | Pratt, Jr. .............. H04L 12/66 370/406 |
| 2010/0008368 | A1 | 1/2010 | Karloff |
| 2012/0014316 | A1 | 1/2012 | Rahman |
| 2012/0173527 | A1 | 7/2012 | Thiesson |
| 2012/0238235 | A1 | 9/2012 | Lee |
| 2013/0036236 | A1 | 2/2013 | Morales et al. |
| 2013/0232565 | A1 | 9/2013 | O'Connor et al. |
| 2014/0044008 | A1 | 2/2014 | Skalecki et al. |
| 2014/0126416 | A1 | 5/2014 | Yu et al. |
| 2014/0165163 | A1 | 6/2014 | Salkintzis |
| 2014/0177522 | A1 | 6/2014 | Marshack |
| 2014/0229405 | A1 | 8/2014 | Govrin |
| 2014/0278590 | A1 | 9/2014 | Abbassi |
| 2014/0379929 | A1 * | 12/2014 | Cicic .............. H04L 45/58 709/226 |
| 2016/0057004 | A1 | 2/2016 | Ge |
| 2016/0323175 | A1 | 11/2016 | Liu |
| 2017/0117978 | A1 | 4/2017 | Ko |
| 2017/0239394 | A1 | 8/2017 | Fromm et al. |
| 2019/0104056 | A1 | 4/2019 | Poorrezaei |
| 2019/0356498 | A1 | 11/2019 | Hernandez Sanchez et al. |
| 2020/0162335 | A1 | 5/2020 | Chen et al. |
| 2020/0382445 | A1 | 12/2020 | Calmon |
| 2021/0194808 | A1 | 6/2021 | McCormick |
| 2022/0026519 | A1 | 1/2022 | Wu et al. |

FOREIGN PATENT DOCUMENTS

| | | |
|---|---|---|
| CN | 102118456 A | 7/2011 |
| CN | 102752725 A | 10/2012 |
| CN | 103891352 A | 6/2014 |
| CN | 103986512 A | 8/2014 |
| CN | 104579454 A | 4/2015 |
| CN | 105657777 A | 6/2016 |
| CN | 107070798 A | 8/2017 |
| CN | 107231183 A | 10/2017 |
| CN | 107979409 A | 5/2018 |
| CN | 108353439 A | 7/2018 |
| CN | 108390713 A | 8/2018 |
| CN | 108449774 A | 8/2018 |
| CN | 108989223 A | 12/2018 |
| CN | 110505153 A | 11/2019 |
| CN | 111587580 A | 8/2020 |
| EP | 2853068 A1 | 4/2015 |
| WO | 2016069077 A1 | 5/2016 |
| WO | 2019173127 A1 | 9/2019 |
| WO | 2020113214 A1 | 6/2020 |
| WO | 2020193445 A1 | 10/2020 |

OTHER PUBLICATIONS

Hemani Kaushal et al "Optical Communication in Space: Challenges and Mitigation Techniques"; Citation information: DOI 10.1109/COMST.2016.2603518, IEEE Communications Surveys & Tutorials.
M. Gregory et al "TESAT laser communication terminal performance results on 5.6Gbit coherent inter satellite and satellite to ground links"; International Conference on Space Optics—ICSO 2010, Rhodes Island, Greece, Oct. 4-8, 2010.
Zengyin Yang et al "Modeling and Routing for Predictable Dynamic Networks"; arXiv.org > cs > arXiv:1704.00885; Aug. 17, 2018.
"Iridium NEXT: A Global E?ort to Launch the Future of Global Communications"; Apr. 19, 2013 | Featured Stories, Iridium NEXT.
Hueseyin Uzunalioglu et al "A routing algorithm for connectionoriented Low Earth Orbit (LEO) satellite networks with dynamic connectivity"; Published 2000 • Computer Science • Wireless Networks.
Fargnoli, Joseph D. (2016), Technical Narrative, Theia Holdings A, Inc. (Theia Satellite Network), 1455 Pennsylvania Ave., Ste. 600, Washington, D.C., District of Columbia, United States.
Akhavain Mohammadi, Mehdi Arashmid U.S. Appl. No. 17/117,333, filed Dec. 10, 2020.
Ashwood-Smith, Peter et al. U.S. Appl. No. 16/887,675, filed May 29, 2020.
McCormick, William Carson U.S. Appl. No. 16/882,952, filed May 26, 2020.
Akhavain Mohammadi, Mehdi Arashmid et al. U.S. Appl. No. 17/141,824, filed Jan. 5, 2021.
Akhavain Mohammadi, Mehdi Arashmid U.S. Appl. No. 17/140,668, filed Jan. 4, 201.
Akhavain Mohammadi, Mehdi Arashmid U.S. Appl. No. 17/167,540, filed Feb. 4, 2021.
"Geographic Routing"; Wikipedia, Nov. 20, 2019; https://en.wikipedia.org/wiki/Geographic_routing.
"Chapter 6 Geometric Routing" Mobile Computing Winter 2005 / 2006; https://disco.ethz.ch/courses/ws0506/mobicomp/lecture/6/Chapter6GeometricRouting4Slides_v2.pdf.
"Haversine Formula", Wikipedia, Aug. 7, 2019; https://en.wikipedia.org/wiki/Haversine_formula.
Sahhaf et al. Scalable and energy-efficient Optical Tree-based Greedy Router, 2013 15th International Conference on Transparent Optical Networks (ICTON) ,Sep. 19, 2013, 5 pages.
Ericsson Latency analysis of SCell BFR solutions 3GPPTSG-RAN }VGI Meeting #97, R1-1907438 May 17, 2019 (May 17, 2019), 4 pages.

* cited by examiner

PIECEWISE SHORTEST PATH FIRST ROUTING

CROSS-REFERENCE TO RELATED APPLICATIONS

This is the first application filed for the present invention.

FIELD OF THE INVENTION

The present invention pertains to packet-based data networks, such as optical satellite mesh networks, and in particular to a method and apparatus for supporting packet forwarding and routing in such networks.

BACKGROUND

Low earth orbit (LEO) satellite constellations are being developed to provide, among other things, Internet routing services. It is currently proposed that a group of satellites would be distributed in space and organized into a mesh network. Free space optical (i.e. laser) links are proposed as one way for providing high-bandwidth network connectivity between satellites. Other types of links, such as radiofrequency or microwave-based links are also possible. Use of LEO satellite systems generally leads to lower latency than medium earth orbit or geostationary orbit systems, but requires large numbers of satellites.

Data packets can be routed through a satellite mesh network along a variety of paths. Because the satellites are moving rapidly with respect to the surface of the earth, routing of packets toward an earth-based destination requires consideration of satellite locations and proximity to the destination location. Rapidly computing effective routing paths in such scenarios is computationally intensive and current routing methods are subject to improvement and customization to satellite mesh networking.

Geographic routing involves routing of packets based on geographic position information without necessarily relying on knowledge of network topology. Such routing schemes are known for wireless networks but have not been extensively developed for satellite networks. Furthermore, these schemes are subject to improvement in terms of computational efficiency, applicability to scenarios to satellite mesh networks, or both.

Therefore, there is a need for a method and apparatus for supporting packet forwarding in satellite mesh networks and similar networks that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for packet forwarding and routing, for example in satellite networks.

In accordance with embodiments of the present invention, there is provided a method for routing a data packet in a network. The data packet specifies a physical location of a destination for that data packet. The method is performed at a first node of the network in possession of the data packet. The method includes maintaining physical location information for nodes in a limited portion of the network directly coupled to the first node, and maintaining routing information for the limited portion of the network. The limited portion of the network may include at least one node which is indirectly coupled to the node via at least one intermediate node. The method includes selecting, from among the nodes in the limited portion of the network, a target node that meets a predetermined objective with respect to orthodromic distance to the physical location of the destination for the data packet. The method includes determining, based on the routing information, a route through the limited portion of the network to the target node. The method further includes configuring a set of network nodes to cause the packet to traverse the determined route to the target node. In some embodiments, the configuration can involve using source routing for the packet. The method further includes forwarding the packet toward said target node, for example along the determined route.

In accordance with embodiments of the present invention, there is provided a method for routing a data packet in a network, the data packet specifying a physical location of a destination for the data packet. The method includes performing the above-described method steps at some nodes of the network, when those nodes are in possession of the data packet. In particular, the method can be performed at nodes which were designated as target nodes by a prior node in possession of the data packet. Other nodes, upon receipt of the data packet, may simply forward the packet onward to a further node indicated in the packet header, for example according to a source routing protocol.

In accordance with embodiments of the present invention, there is provided a method for routing a data packet in a network. The data packet specifies a physical location of a destination for the data packet. The method includes, at a first node of the network in possession of the data packet, the same maintaining physical location information and routing information and selecting of a target node steps as described above. The method further includes determining, based on the routing information, a next node belonging to the limited portion of the network and located along an available network path between the first node and the target node. The method further includes configuring the next node to preferentially forward the packet toward the target node. The method further includes forwarding the packet toward said next node. Configuring the next node to preferentially forward the packet toward the target node may include configuring the packet to carry an identifier of the target node. In this case, the next node is configured to route the packet toward the target node when it is capable of determining a route to the target node based on routing information held by the next node. Otherwise the next node may select a new target node.

In accordance with embodiments of the present invention, there is provided an apparatus for routing a data packet in a network. The data packet specifies a physical location of a destination for the data packet. The apparatus is located at a first node of the network in possession of the data packet and includes a network interface and processing electronics. The apparatus is configured to maintain physical location information for nodes in a limited portion of the network directly coupled to the first node. The apparatus is configured to maintain routing information for the limited portion of the network. The limited portion of the network may include at least one node which is indirectly coupled to the node via at least one intermediate node. The apparatus is further configured to select, from among the nodes in the limited portion of the network, a target node that meets a predetermined objective with respect to orthodromic distance to the physical location of the destination for the data packet. The apparatus is further configured to determine, based on the routing information, a route through the limited portion of the network to the target node. The apparatus is further configured to configure a set of network nodes to cause the packet to traverse the determined route to the target node. In some embodiments, the configuration can involve using source routing for the packet. The apparatus is further configured to forward the packet toward said target node, for example along the determined route.

In accordance with embodiments of the present invention, there is provided a system for routing a data packet in a network, the data packet specifying a physical location of a destination for the data packet. The system includes a plurality of network nodes or associated apparatuses of network nodes, at least some of which are configured to operate as described above when in possession of the data packet. That is, there is provided system for routing a data packet in a network, the data packet specifying a physical location of a destination for the data packet, the system comprising a plurality of nodes of the network. Each node includes a network interface and processing electronics and configured, when in possession of the data packet, to maintain physical location information for respective nodes in a limited portion of the network directly coupled to the node, and maintain routing information for the limited portion of the network. The limited portion of the network may include at least one node which is indirectly coupled to the node via at least one intermediate node. Each node is further configured to select, from among the nodes in the limited portion of the network, a target node that meets a predetermined objective with respect to orthodromic distance to the physical location of the destination for the data packet. Each node is further configured to determine, based on the routing information, a route through the limited portion of the network to the target node; configure a set of nodes to cause the packet to traverse the determined route to the target node (for example using source routing); and forward the packet to said target node.

In accordance with embodiments of the present invention, there is provided an apparatus for routing a data packet in a network. As above, the data packet specifies a physical location of a destination for the data packet, and the apparatus is located at a first node of the network in possession of the data packet, and includes a network interface and processing electronics. The apparatus is configured to maintain physical location information and routing information and select a target node, as already described above. The apparatus is further configured to determine, based on the routing information, a next node belonging to the limited portion of the network and located along an available network path between the first node and the target node. The apparatus is further configured to configure the next node to preferentially forward the packet toward the target node (e.g. by configuring the packet to carry an identifier of the target node), and to forward the packet toward said next node.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
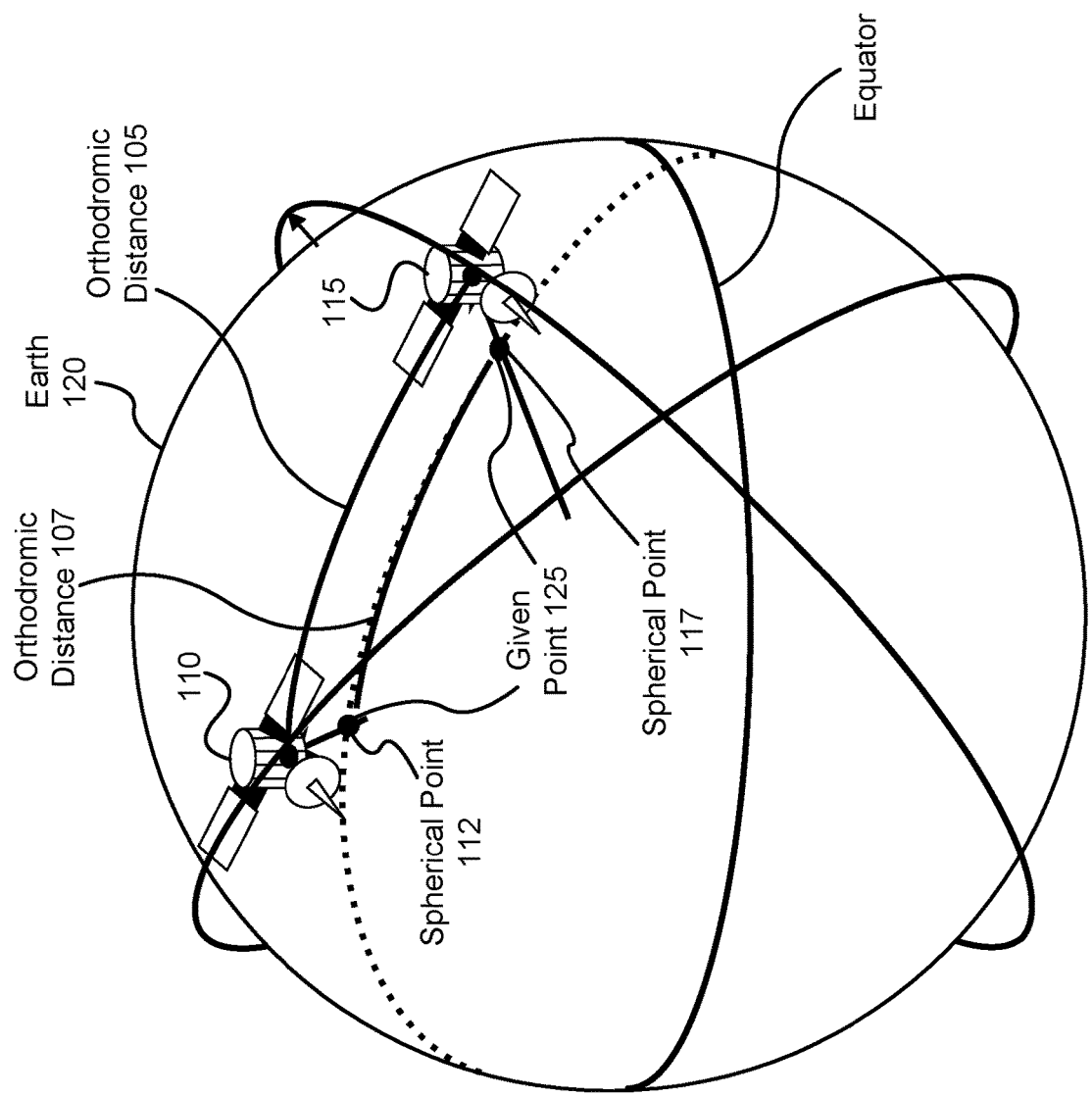
FIG. 1 illustrates orthodromic distance between two satellites orbiting a sphere (earth).

As used herein, the term "about" should be read as including variation from the nominal value, for example, a +/−10% variation from the nominal value. It is to be understood that such a variation is always included in a given value provided herein, whether or not it is specifically referred to.

Satellite-based networks potentially provide global connectivity and may also provide new coverage extensions in Fifth Generation (5G) communications technologies, as defined for example by the 3$^{rd}$ Generation Partnership Project (3GPP). Overall industry interest is to deploy inter-satellite links to route user traffic over multiple satellites. In this regard, use of low earth orbits (LEO) satellite systems may be appropriate, as such systems have lower round trip latency and lower launch costs compared to Medium earth orbit (MEO) and Geostationary earth orbit (GEO) systems. However, an effective global network requires potentially large numbers of LEO satellites. On the other hand, the dynamic nature of satellite network constellations presents challenges for existing routing protocols due for example to the existence of an orbital seam, the size of network, and the requirement to timely communicate network changes to all nodes as they occur.

Embodiments of the present invention address network routing challenges in the context of satellite networks. Specific focus is in the application to non-terrestrial massive (satellite) polar and walker-delta constellation networks in order to provide global communications services that may not be supported by terrestrial (e.g. wire line or fibre-based) networks. Various embodiments provide for a flat network routing paradigm in which each network node is only required to have local knowledge of network conditions. This limits the requirement to propagate network condition updates (e.g. via flooding link status update messages) through the network. In particular, in various embodiments, the updates only need to be communicated locally within a limited network region. Because only local knowledge is utilized, routing calculation time and control-plane/data plane processing complexity may also be limited. This can be particularly important considering the massive scale of the LEO satellites (where existing terrestrial routing mechanisms do not scale) and also the limited on-board processing available on the LEO satellite nodes.

While GEO satellites are stationary to the side of the earth they are facing, MEO and LEO satellites are considered to be mobile with some time periodicity. That is, they meet the same point of the earth after a specific time period which is dependent on their altitude. GEO satellites are located at 22,236 miles (35,786 kilometers) above Earth's equator. Due to high altitude of these satellites and long the round trip delay, GEO satellites are not a proper option for broadband, low delay data networks. LEO satellites however, provide global coverage over the earth and are capable of reusing frequency more effectively. LEO satellite networks can provide ubiquitous connectivity with low latency. A characteristic of these satellite networks is that many satellites are typically needed to provide global coverage, mainly due to the low altitude of the individual satellites.

In satellite communication technologies, a satellite constellation is defined as a group of satellites with coordinated ground coverage and shared control rotating in LEO orbits. Two main satellite constellations are "polar constellation" and "walker delta constellation". Walker delta constellations are thought to provide better uniform coverage over the earth almost everywhere except poles, where no coverage is provided. Polar constellations however provide a dense coverage over the poles and less dense coverage over the equator.

Satellite network nodes may have two types of interfaces: Ground communication interfaces, and Inter-satellite link (ISL) communication interfaces. The ground communication interfaces can be microwave systems operating in X-band or ka-band. The ISL interfaces can use communication lasers and can provide for high-speed optical free-space communication links between the satellite nodes. ISL links include intra-orbit links, i.e. links between (typically adjacent) satellites in a common orbit but spaced apart, and inter-orbit links, i.e. links between satellites in different (typically adjacent) orbits.

Due to the dynamic nature of the satellite networks, the ISL characteristics also change dynamically. Even for intra-orbit ISLs where link distance is constant, the link behavior may change as the satellites pass over different parts of the earth (e.g. at the poles). The dynamic range of characteristics for the ISLs is significantly larger for inter-orbit ISLs for both polar and walker delta constellations. Due to the dynamically changing ISL links, attributes the network topology in satellite networks is considered to change dynamically. The impact of network topology changes, link failures and link creations, link level optical impairments as well as Doppler effect makes packet routing a significant challenge in satellite data networks. This is particularly the case in dense LEO satellite networks where network events are frequent. Packet addressing is another challenge. Additionally, satellite onboard processing capability is limited and therefore it is desirable to limit the amount of onboard processing that is required to perform functions such as network routing.

One issue in satellite networks relates to flooding behavior and integration with ground segments of the network. Internet protocol (IP) based routing does not scale well with very large flat satellite networks requiring minimum delay (distance) routing. This is due to the fact that the satellite network topology is dynamic and minimum distance paths change over time.

Embodiments of the present invention provide for a routing scheme potentially applicable to massive large scale satellite networks. Spatial location can be used as parts of network node identifiers. Geographic routing of packets can be used, along with a link cost metric defined as or correlated with the length of a communication link. As a result, and in some embodiments, network routes for packet forwarding may be determined solely based on positional (e.g. longitude/latitude) information. This may facilitate routing of packets from source to destination with substantially minimal distance of communication links.

Link failures occur frequently in large scale massive satellite networks. In single-hop geographical routing with link failures, alternate path routing may take packets farther from their destination. This tends to lead to failure of single-hop geographical routing. This problem arises due to the fact that the entire region of the network may not be visible to each node. Since performing network status updates (e.g. via flooding) is time consuming, network convergence is relatively slow. When network status changes are frequent, this can result in network information at each node failing to adequately track the actual network state.

When using a LEO satellite mesh network to route a packet to a ground-based destination, it is notable that the satellite constellation typically moves rapidly relative to the destination. This makes it challenging to determine, at a given time, which path to forward the packet on so that it efficiently reaches the destination. For example, it may be desirable to determine which target satellite is currently closest (or adequately close) to the ground destination so that the packet can be routed along a path toward that satellite. Constellation geometry can be used to facilitate such routing. In particular, according to embodiments of the present invention, the satellite constellation can be configured to route packets toward the target satellite which is geometrically closest to the destination location (or which is among a subset of satellites which are relatively closer to the destination location). To facilitate this, geographic routing may be employed in which the destination address for each packet includes an indication of a geometric (geographic) location of the destination of the packet. This location can be part of the destination address, for example. Geographic routing can also be used in other scenarios. According to geographic routing, data packets specify a physical location of a destination, for example in a header thereof. The physical location can be given in terms of spatial coordinates, which may be specified for example using latitude and longitude, coordinates in a polar coordinate system, or coordinates in a Cartesian coordinate system.

Source routing typically involves a first node (e.g. a satellite), when in possession of a packet, identifying a target node to which the packet is to be transmitted, and, when the target node is not directly linked to the first node, a sequence of nodes to which the packet is to be forwarded in turn. The nodes in the sequence are directly linked in series and the nodes and links define a path from the first node to the target node. The target node can be selected as a node, which is within a limited local neighbourhood of the node holding the packet, and which is closest to the final packet destination, or among the closest nodes (within the local neighbourhood) to the final packet destination. Routing tables can be maintained for the purpose of identifying suitable target nodes and corresponding sequences of nodes based on packet destination information. Distributed link-state routing protocols, such as open shortest path first (OSPF) protocols, can be used to maintain routing tables. Link state information can be shared between nodes using control plane messaging.

It is noted that, due to the use of source routing (or similar schemes to be described below), packets are substantially guaranteed to pass through selected target nodes. This property may be used as a basis for facilitating features such as traffic engineering and quality guarantees. Source routing is one scheme by which network nodes can be configured to cause a packet to traverse a particular route to a particular target node. In particular, each of the network nodes subsequently in receipt of the packet is "configured" by processing of the source routing information written into the packet (e.g. in the packet header). The source routing information designates one or more intermediate nodes to be traversed in turn by the packet, where the intermediate nodes define the determined route to the target node.

In networks involving mobile nodes, such as LEO satellite nodes, the relative motion of satellites with respect to each other, ground nodes, or both, can result in time-varying network topology and link availability. Maintaining routing tables and link state information globally therefore becomes a challenging task. It is therefore useful to consider alternative routing methods, which can be implemented using limited information. The limited information may include node location and link state information for only those nodes in a local neighbourhood of a given node making a routing decision. For example, according to embodiments of the present invention, each network node maintains node location and link status information for a limited portion of the network that is local to that network node. The packet specifies its destination location, for example using geographic coordinates in a header thereof. As such, a network node can determine distance from each node in its local neighbourhood to the final destination.

FIG. 1 illustrates orthodromic distance 105 between two satellites 110, 115 orbiting a sphere (earth) 120. The orthodromic distance 107 between two points 112, 117 on the sphere is also shown. Point 112 is located at the intersection of the sphere 120 with a line or vector passing through a given point 125 (typically at the center of the sphere 120) and also passing through the location of the satellite 110. Point 117 is located at the intersection of the sphere 120 with a line or vector passing through the given point 125 and also passing through the location of the satellite 115. The orthodromic distance 107 is the length of an arc located between the points 112 and 117, where the arc is part of a circle defined by the intersection of a surface of the sphere 120 with a plane passing through points 112, 117 and 125. (Note that the plane can be equivalently defined as passing through the locations of satellites 110, 115 and point 125.) The orthodromic distance 105 is similarly the length of an arc between the locations of satellites 110 and 115, where the arc is part of a circle defined by the intersection of a sphere concentric with the sphere 120 and containing the orbits of the satellites 110, 115. Orthodromic distance is also referred to as great circle distance.

Figure 2:
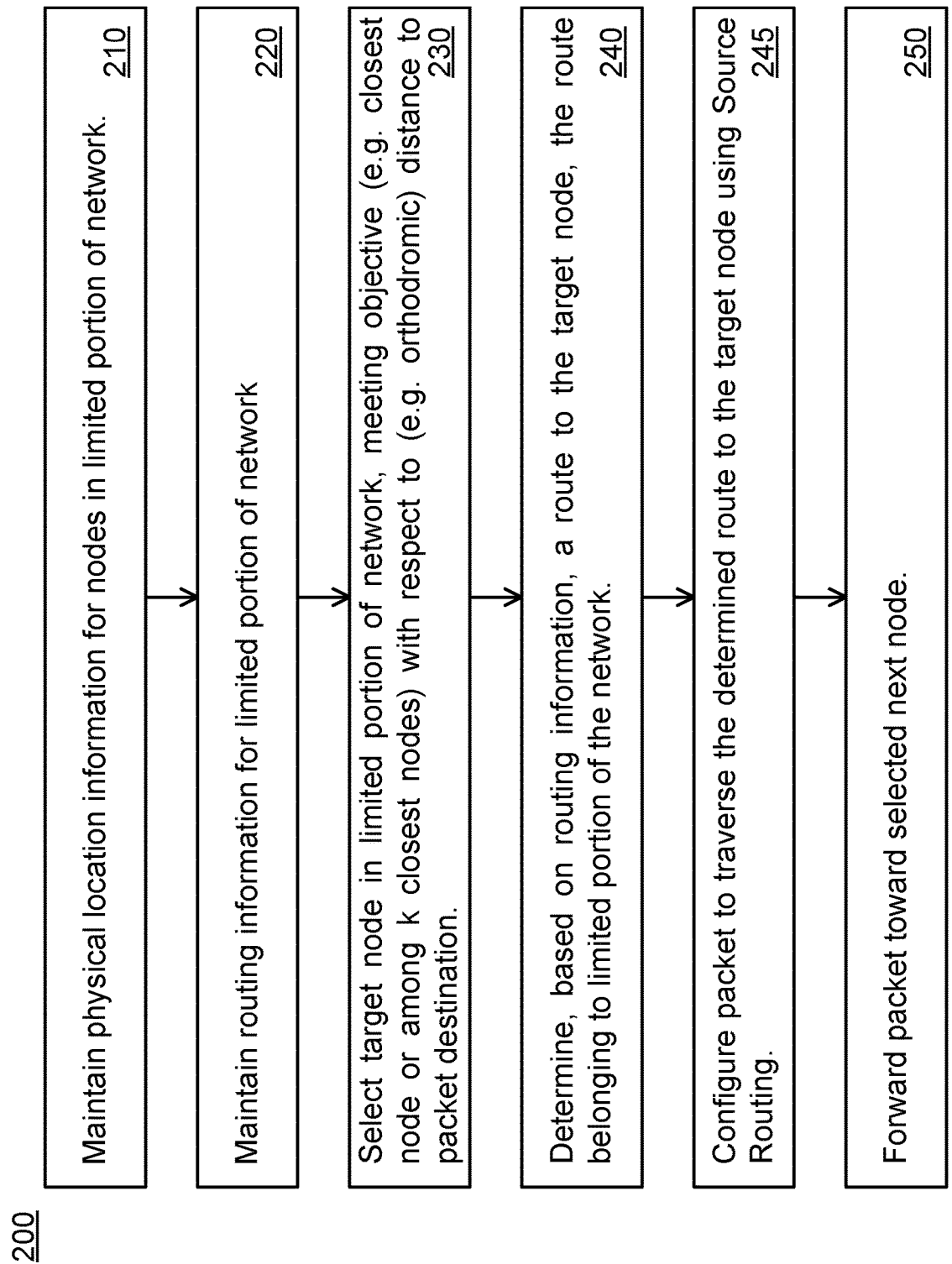
FIG. 2 illustrates a method for routing a data packet in a network, according to embodiments of the present invention.

Embodiments of the present invention relate to routing and forwarding of data packets in a communication network. The data packets employ geographic routing, so that they specify a physical destination location, for example in headers thereof. With reference to FIG. 2, a method 200 provided according to such embodiments includes maintaining 210 physical location information for nodes in a limited portion of the network directly coupled to the first node. The physical location information can be provided in terms of geographic coordinates, such as but not necessarily limited to latitude/longitude coordinates. The method further includes maintaining 220 routing information for the limited portion of the network. The routing information can include, for example, current availability of communication links between nodes in this limited portion of the network.

For clarity, it can be considered, in various embodiments, that the limited portion of the network includes at least one node which is indirectly coupled to the first node via at least one intermediate node. That is, the limited portion of the network includes more than just the nodes that are within one hop of the first node. Although this is not strictly necessary for operability, it allows for meaningful routing to be performed within the limited portion of the network. This also allows for packets to be routed over longer (multi-hop) distances before a new route needs to be determined, which can improve routing efficiency. In other cases, it is accepted that some or possibly all limited portions of the network are restricted to nodes that are within one hop of the first node.

The method 200 further includes selecting 230 a target node. The target node is selected, from among the nodes in the limited portion of the network, such that the target node that meets a predetermined objective with respect to distance to the physical location of the destination for the data packet. The distance from the target node to the destination location may be a general correlation function of the latitude and longitudes of the target node and the destination location. The distance may be an orthodromic (great circle) distance. The objective may be, for example, that the target node is the closest node (in the limited portion of the network) to the data packet destination, or that the target node is among the k relatively closest nodes (in the limited portion of the network) to the data packet destination.

In support of selecting the target node, the method may include determining respective (e.g. orthodromic) distances (or approximations thereof) between at least some of the nodes in the limited portion of the network and the physical location of the data packet destination. The orthodromic distances may be determined based on a Haversine or Cartesian function calculation, or an approximation thereof.

The method 200 further includes determining 240, based on the routing information, a route to the target node. When the target node is directly linked to the first node, the route can simply involve the direct link to the target node. When the target node is indirectly linked to the first node, for example via one or more intermediate nodes belonging to the limited portion of the network and located along an available network path between the first node and the target node, the route can include the intermediate nodes and the communication links between the first node and an intermediate node, and between an intermediate node and the target node. The route, or equivalently the intermediate nodes, can be determined using a shortest path first (SPF) algorithm, for example, based only on information regarding the limited portion of the network. The route belongs to the limited portion of the network as seen by the node currently performing the method 200.

The method further includes configuring 245 the packet to traverse the determined route to the target node using source routing. Source routing involves configuring the packet to include (e.g. in a designated header field) an ordered list of identifiers of nodes along the determined route to be visited in turn. For example, the route may include a first intermediate node, a second intermediate node, and the target node, where the first node is directly linked to the first intermediate node, the first intermediate node is directly linked to the second intermediate node, and the second intermediate node is directly linked to the target node. In this case, a source routing header field in the packet can be configured to list, in order, the first intermediate node, the second intermediate node, and the target node. The method further includes forwarding 250 the packet toward said target node along the determined route. The method 200 may then be repeated at the target node, or at some or all subsequent nodes in receipt of the packet which are designated as target nodes by a prior node in receipt of the packet.

As used herein, the term "source routing" is intended to include segment routing. Segment routing is described for example in the Internet Engineering Task Force (IETF) document numbered RFC 8402 and entitled "Segment Routing Architecture," July 2018.

More generally, according to embodiments of the present invention, and as implemented in practice by using source routing or a variation thereof, the packet is routed to the target node based on the physical location information and routing information for the limited portion of the network directly coupled to the first node. As mentioned previously, this information is maintained by the first node (i.e. the node in possession of the data packet). Source routing is one means by which this can occur, because the first node dictates the packet routing itself, guaranteeing that the routing is based on the first node's information. However, in other embodiments of the invention, a different (possibly more distributed) routing approach can also be implemented to achieve this effect. For clarity, source routing embodiments will be described first below, followed by alternative embodiments.

According to the above, each node of the network operates within a limited, pre-defined portion of the network that is a strict subset of the entire network. The node maintains information for this limited portion of the network. Within this limited portion, routing can occur, for example using a routing protocol such as or similar to the open shortest path first (OSPF) protocol. The routing may use a geographic address specified in the packet. This causes the data packet to be forwarded toward a target node that is closer to the data packet destination.

As mentioned above, source (or segment) routing may be used to route the packet from a first node to a target node, potentially via one or more intermediate nodes. According to source routing, the first node may specify one or more nodes which are to receive and forward the packet to a next specified node. A source (or segment) routing header (SRH) may be used for this purpose, as would be readily understood by a worker skilled in the art. The SRH may involve a sequence of destination addresses specified in consecutive fields of the SRH. It is noted that the destination addresses can be or include geographic (physical) locations. The first destination address in the sequence is treated as the active destination address and network infrastructure is configured to forward the packet toward the node corresponding to this address. Once the node corresponding to the destination address receives the packet, this destination address is removed from the packet and the next destination address in the sequence becomes the first, active destination address. The process then repeats. When all destination addresses are removed in this manner, the node in possession of the packet is the target node. The target node can then perform further source routing, if required. In an alternative implementation, rather than remove destination addresses, an index field is used to point to the currently active destination address. Once the node corresponding to the destination address receives the packet, the index field is updated so that it points to the next destination address in the sequence.

In addition to source routing or an alternative scheme, embodiments of the present invention can include an anti-loop scheme which inhibits packets from being forwarded indefinitely between the same set of two, three or more nodes. In particular, each time a target node (e.g. a node which performs source routing) is traversed, an identifier of that node is written into the packet. Thus, the packet carries identifiers of the target (routing) nodes which it has already traversed. The packet can include a header field or sequence of header fields for containing such identifiers. This is referred to as the previously visited targets header (also referred to as a target nodes header). Subsequently, when target selection is performed for the packet, the target selection operations refrain from selecting, as the next target node, nodes corresponding to identifiers listed in this header field or sequence of header fields. That is, the target selection is configured to refrain from selecting, as the next target node, each and every node listed in the previously visited targets header. These nodes are thus excluded from selection, in order to mitigate or avoid the presence of multi-hop loops. This can be implemented for example by ignoring the existence of such nodes as target nodes when performing the target selection. It is noted that, in various embodiments, the nodes listed in the previously visited targets header may still be specified in the source routing header as intermediate nodes. Because source routing is used (in some embodiments), only a limited number of nodes which handle the packet are target nodes. (In particular, only the last node in the SRH is a current target node.) This makes implementation of the previously visited targets header more feasible, because not every node traversed by a packet needs to be listed in the packet's previously visited targets header.

Figure 3A:
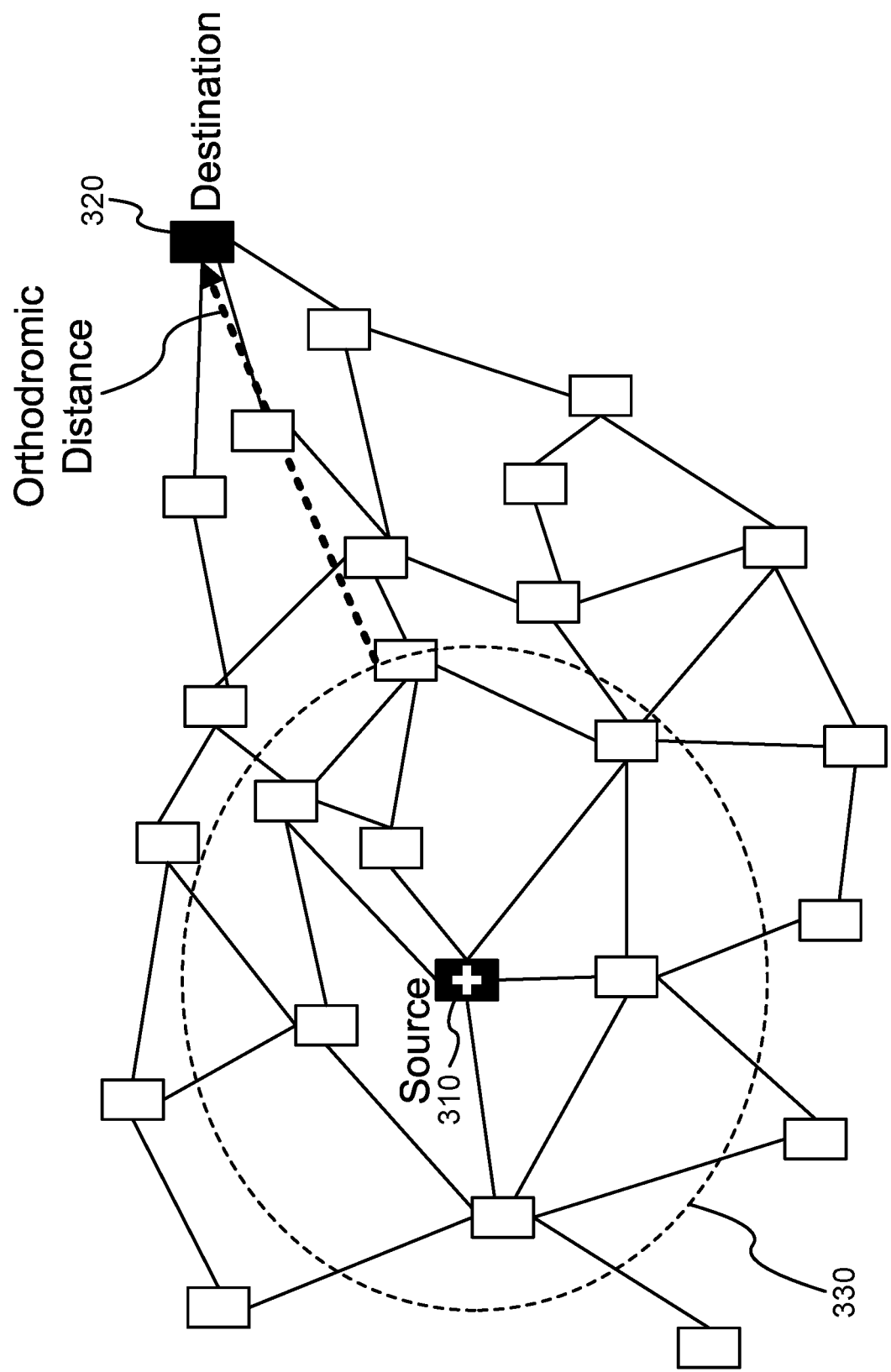
FIG. 3A illustrates a portion of a network showing packet routing operations at a first node, according to an example embodiment of the present invention.
Figure 3B:
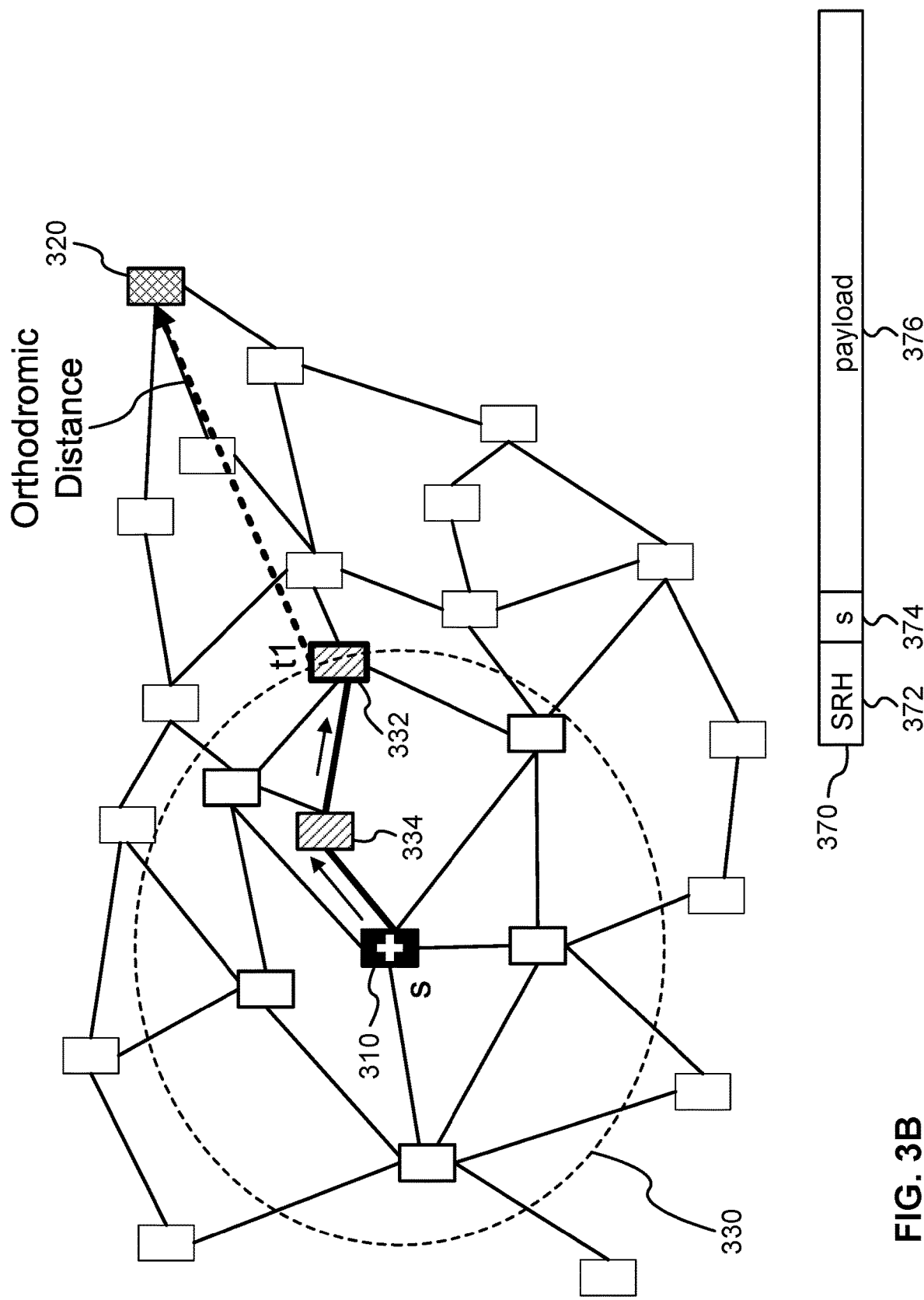
FIG. 3B further illustrates the portion of the network of FIG. 3A, showing additional packet routing operations at the first node, according to the example embodiment of the present invention.

FIG. 3A illustrates an example network with an irregular topology. A first node 310 in possession of the data packet and a destination 320 for the data packet are shown. The destination may be indicated in the packet using an indication of physical location. Further illustrated is a limited portion 330 of the network coupled to the first node 310. This limited portion 330 can also be referred to as the routing region for the first node 310. According to an embodiment of the present invention, the first node determines a target node 332 within the limited portion 330 of the network. FIG. 3B illustrates the target node 332.

In one embodiment, the target node 332 is selected as the node, within the limited portion 330 of the network, which has minimum orthodromic distance to the destination 320.

As mentioned above, the orthodromic distance can be calculated using the Haversine formula, based on latitude and longitude coordinates of the nodes, or based on an associated Cartesian formula. The orthodromic distance to the destination 320 can be determined for multiple network nodes, for example some or all nodes within the limited portion 330 of the network. The node with minimum orthodromic distance to the destination can then be selected from among these multiple nodes. For this purpose, the first node 310 can maintain physical location information for some or all nodes in the limited portion 330 of the network.

Routing information for this limited portion 330 of the network is also maintained, which may include information regarding available communication links between the nodes in the limited portion 330 of the network. Location and routing information can be maintained for example by passing messages among nodes, the messages being indicative of and in response to location changes, routing changes, or both. The routing information may include a routing table which is maintained based on one or both of: dynamic updates of status of communication links between nodes in the limited portion of the network; and dynamic changes to a topology of the network. The topology of the network can refer to the presence of nodes and links in the network, for example the limited portion thereof.

Still referring to FIG. 3B, the first node then uses its routing information (e.g. routing table) to determine a complete route to the target node 332. In the present example, the complete route includes a next node 334, directly coupled to the first node, and the target node 332. The next node 334 is along a viable (e.g. shortest) path to the target node 332. The first node may select the target node based on latitude/longitude information. The first node may then look up, in its (e.g. SPF) routing table, a set of nodes (in this case the next node 334) located along a path toward the selected target node. Various criteria can be used to select the set of nodes, as will be readily understood by a worker skilled in the art. For example, the set of nodes may be selected as defining a SPF route determined using Dijkstra's algorithm. The set of nodes should be along a viable network path between and connecting the first node and target node. The viable network path chosen can be a preferred path to the target node, which is determined based on a predetermined rule, such as the SPF rule.

FIG. 3B also illustrates the packet 370 including a source (or segment) routing header (SRH) 372, previously visited targets header 374, and payload 376. This represents the packet as it appears after configuration by the first node 310 and during traversal to the target node 332. The SRH 372 includes identifiers of the set of nodes located along the path to (and inclusive of) the target node 332. In the present example the SRH will include identifiers of the next node 334 and the target node 332. As each node receives the packet, it removes its own identifier from the beginning of the SRH (or else updates an index field to point to the next identifier in the SRH) and forwards the packet toward the next node listed in the SRH. The previously visited target header 374 includes a list of identifiers of target nodes which previously handled the packet and performed (for that packet) target selection, source routing, or an alternative to source routing. In the present example, the previously visited target header 374 includes an identifier of the first node 310.

The packet is forwarded along the determined route to the target node (e.g. using source routing), so that it traverses all nodes along the route (path). The next node 334, because it is an intermediate node along the route, simply forwards the packet onward to the node listed next in the SRH. The target node 334, because it is the last node along the route and the last node listed in the SRH, performs further routing and handling of the packet.

Figure 3C:
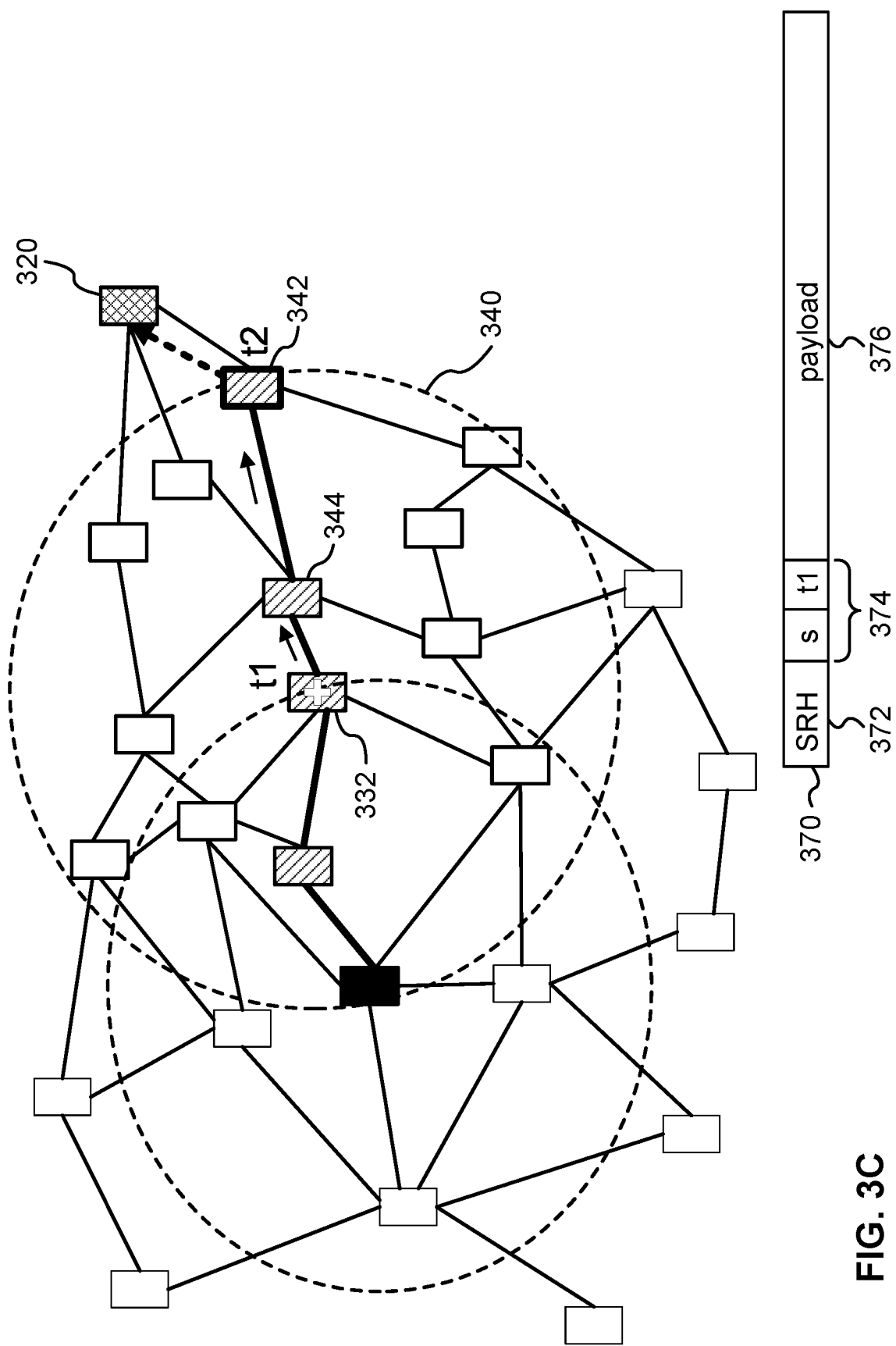
FIG. 3C further illustrates the portion of the network of FIG. 3A, showing packet routing operations at a second node, according to the example embodiment of the present invention.

FIG. 3C illustrates repetition of the process by the target node 332, upon receipt of the packet thereby. The target node 332 sees (i.e. maintains location information and routing information for) a different limited portion 340 of the network, and selects another target node 342 as the node, within the different limited portion 340 of the network, which has minimum orthodromic distance to the destination 320. In selecting the next target node, the node 332 omits consideration of the nodes listed in the previously visited targets header as received by the target node. In other words, node 310 is omitted from consideration as the next target node. This inhibits the potential for creating fatal loops in the routing, which would have the packet returned to a previously visited node, such as the first node 310, which previously performed source routing (or an alternative) on that packet. This might occur for example when the target node receives the packet and routes the packet back toward the first node (as the next target node). The first node 310 and the target node 332 would then potentially repeat their prior routing actions, resulting in the packet being stuck in a loop.

It is possible for non-fatal loops to occur in a packet routing process. In particular, this may occur when the shortest path to a target node cuts across (shares a node with) one of the shortest paths traversed by the packet before. These types of loops are not fatal since the packet is routed using source routing (or an alternative). That is, although the packet is traverses a node twice, the packet is still guaranteed to reach its current target node, which is inhibited from being the same as any previous target node. This may cause some routing inefficiencies (as a packet may traverse some previously seen nodes). However, this potential occurs because the routing is performed locally without global knowledge of the network topology. By making the decision locally, the computational complexity and memory requirements for supporting routing is reduced, which can be important for limited on-board processing nodes such as satellite nodes.

The target node 332 then uses its routing information to determine a complete route to the further target node 342. In the present example, the complete route includes a next node 344, directly coupled to the target node 332, and the target node 342. The packet is then forwarded along the determined route using source routing (or an alternative). In other words, the target node 332 repeats the same process as the first node 310.

FIG. 3C also illustrates the packet 370 including a source (or segment) routing header (SRH) 372, previously visited targets header 374, and payload 376. This represents the packet as it appears after configuration by the first target node 332 and during traversal to the second target node 342. The SRH 372 includes identifiers of the set of nodes located along the path from the first target node 332 to (and inclusive of) the second target node 342. In the present example the SRH will include identifiers of the next node 344 and the second target node 342. In the present example, the previously visited target header 374 includes an identifier of the first node 310 and an identifier of the first target node 332.

Figure 3D:
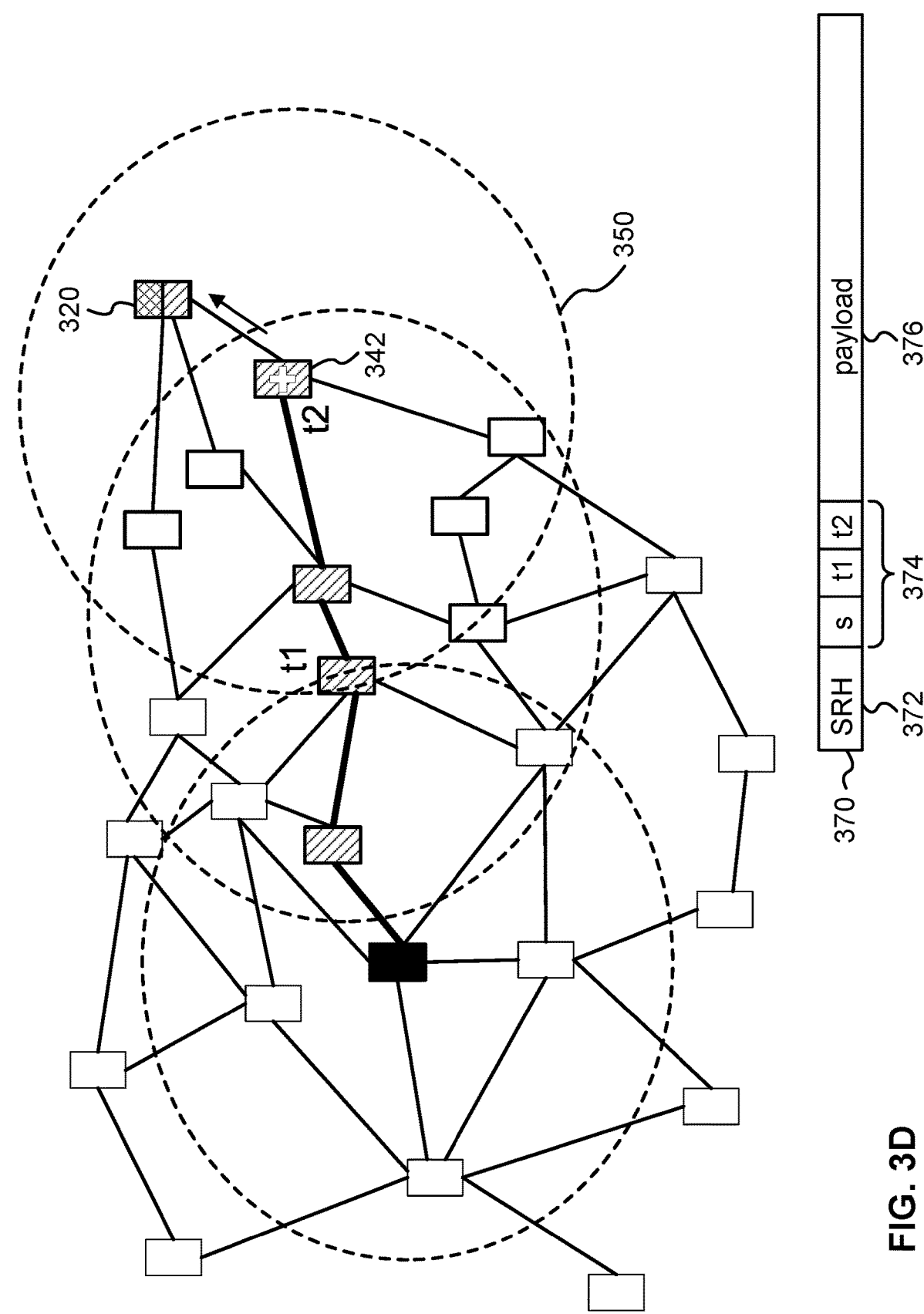
FIG. 3D further illustrates the portion of the network of FIG. 3A, showing packet routing operations at a third node, according to the example embodiment of the present invention.

In FIG. 3D, node 342, in possession of the packet, sees a limited portion of the network 350, which now includes the destination 320. As such, node 342 selects the destination 320 to be the target node. The node 342 then uses its routing information to determine a complete route to the destination 320. In the present example, the complete route includes only the destination node 320, because the nodes 342 and 320 are directly coupled via a single communication link. Therefore, the network path is only one hop in length and source routing appears to be the same as one-hop routing (in which only the immediate next node is selected). The packet is then forwarded along the determined route using source routing, which in the present case appears the same as conventional one-hop routing. In other words, the target node 342 repeats the same process as the first node 310.

Although FIGS. 3B and 3C show the target nodes 332, 342 being at the edge of the limited network portions 330, 340 of the active routing nodes 310, 332, respectively, this is not necessarily always the case. All network nodes may potentially be routing nodes. However, the term "active routing node" refers to a node which actively makes routing decisions for a particular packet. Active routing nodes typically consist of source nodes and target nodes, as discussed herein. For example, in FIG. 3D, the target node 320 is likely not on the edge of the limited network portion 350.

Because the previously visited targets header only keeps identifiers of target nodes visited, rather than all nodes, the average size of this header is reduced. Further, short (e.g. two-byte or less) identifiers may suffice inclusion in this header. In some embodiments, the SRH may be filled at each active routing node (target node or source node) and is gradually emptied as the packet is source-routed towards the next target. Therefore, the average size of the SRH is also mitigated. Furthermore, the size of the SRH is limited because the limited portions of the network are also limited in size. The SRH is replaced with a new SRH at each active routing node.

In the above example, the target node may be selected as the single node which is closest (in orthodromic distance) to the packet final destination. The selection is from among all nodes in the limited portion of the network, from the view of the node performing the selection. However, in various other embodiments, the target node may be selected as one node among a plurality of candidate target nodes which are relatively closer to the packet final destination, or which meet some other predetermined objective. For example, the k nodes which are closest (in orthodromic distance) to the packet final destination can be determined, and the target node can be selected from among these k nodes. The selection can be random or based on a predetermined and potentially arbitrary rule. For example, target node selection can be performed in accordance with equal cost multipath routing. In this scheme, a hash function may be applied to a flow and the target node selected based on the output of the hash function. This allows flows toward the same destination to be spread across a set of equal cost targets.

As mentioned above, the orthodromic distance between two nodes can be determined based on the Haversine function. The Haversine function is used to determine the great circle distance between two points on the surface of a sphere given their coordinates in latitude and longitude. The Haversine function itself is given by the formula:

$$d = 2r \arcsin\left(\sqrt{\sin^2\left(\frac{\varphi_2 - \varphi_1}{2}\right) + \cos\varphi_1 \cos\varphi_2 \sin^2\left(\frac{\lambda_2 - \lambda_1}{2}\right)}\right)$$

Here, d is the distance, r is the radius of the sphere (earth) and $(\varphi_1, \lambda_1)$ and $(\varphi_2, \lambda_2)$ are the (latitude, longitude) coordinates of the first and second of the two points, respectively. The 2r term can be removed from this formula for computation of a distance metric as it applies equally to all distances.

It is noted that the orthodromic distance can be approximated without necessarily evaluating the Haversine function for every pair of points. For example, a lookup table operation or evaluation operation using a simpler (e.g. polynomial or piecewise function) can be performed. The output of this operation can be approximately the same as the output of the Haversine function. Furthermore, the operation approximating the Haversine function does not necessarily need to be an accurate approximation. The distance measurement is used in the present invention to compare different pairs of distances. In particular, the approximate distance metric only requires the property that, whenever the distance (e.g. as measured using Haversine) between points A and B is greater than the distance between points C and D, the approximate distance metric applied to points A and B yields a greater value than the approximate distance metric applied to points C and D (note points A and C can be the same point). For purposes of the present invention, this approximate distance metric qualifies as an approximate Haversine function. The approximation is such that, the target node selection made using the approximation is substantially the same as the target node selection that would be made using the Haversine function, or another function which accurately determines orthodromic distance.

Alternatively, orthodromic distance can be evaluated using a Cartesian approach, which is described as follows. The locations of two points on the surface of a sphere (e.g. Earth or an orbital sphere surrounding Earth at a given altitude) are specified by two vectors P1 and P2. The two vectors originate at a location O, typically the center of sphere, and the first vector terminates at the first point while the second vector terminates at the second point. The two vectors are specified in a three-dimensional Cartesian coordinate system. Vector P1 has X, Y and Z coordinates in this coordinate system as given by the vector values (P1x, P1y, P1z), while Vector P2 has coordinates given by values (P2x, P2y, P2z). In this case, it can be shown that the orthodromic distance between the two points is a function of the dot product of the two vectors P1 and P2. Specifically, the orthodromic distance is given by:

$$d = \cos^{-1}(P1x*P2x + P1y*P2y + P1z*P2z) = \cos^{-1}(P1 \cdot P2)$$

Approximations of the orthodromic distance given by the above function can also be used. For example, the function $\cos^{-1}$ can be replaced with an approximation, such as a linear or polynomial approximation. The Cartesian function indicated above can be approximated in various ways similarly to the Haversine function.

According to the Cartesian function, orthodromic distance between two network locations can be determined or approximated by computing an inner product of a first vector and a second vector, the first vector originating at a first point (e.g. center of Earth) and directed toward one of the network locations, and the second vector originating at the first point and directed toward the other one of the network locations. One of the network locations can be the location of a node in the limited portion of the network, and the other can be the physical location of the destination for the data packet.

For simplicity, and in some embodiments, when the two locations are at different altitudes (e.g. one is the location of a terrestrial network node and the other is the location of a satellite node), the two nodes can be treated as if they are at a common altitude for purposes of computing orthodromic distance. In other embodiments, an additional distance can be added to the computed orthodromic distance, in order to reflect the altitude difference.

The limited portion of the network can be of a particular or configurable size. Larger sizes generally require higher maintenance, for example in terms of message passing and computation, in order to keep routing tables up to date. However, larger sizes are also advantageous because it is more likely that the shortest path to the target node is closer to being along the shortest path to the packet's final destination. The limited portion of the network can be sized based on operational requirements. For example, the sizing can be set based on link outage characteristics of the network. When link outages are expected to be more frequent, the limited portion of the network can be of a larger size, thus encompassing more nodes. When link outages are expected to be less frequent, the limited portion of the network can be made smaller. The sizing can additionally or alternatively be set based on considerations such as the desired average number of nodes to be included in the source routing header (when used), the desired average number of nodes to be included in the previously visited target header, or a combination thereof. For example, to reduce the average number of nodes in the previously visited target header, the limited portion of the network can be made larger. However, this also tends to increase the size of the SRH. The sizing can additionally or alternatively be set based on the number or length of network segments that can be subjected to traffic engineering, as will be described in more detail below.

The size of the limited portion of the network (for one or more nodes) can be specified for example in terms of number of hops, radius, or spatial region. For example, the limited portion of the network may be specified as encompassing all nodes of the network which are within a predetermined number (e.g. greater than one) of hops from the first node, or encompassing all nodes of the network which are within a predetermined distance of the first node; or encompassing all nodes which are in a predetermined spatial region (such as a sphere or regular or irregular region) containing or adjacent to the first node. The first node can be on the edge of or within (e.g. at the center of) the limited portion of the network. Sizing of the limited portion of the network can then be controlled by adjusting the predetermined number of hops, the distance, or the spatial region. In this context, the first node is the node for which the limited portion of the network is being determined. Different nodes can see different respective limited portions of the network.

Because each node maintains physical location and routing information only for a limited portion of the network, (e.g., for all nodes within n-hops of the given node), each node only needs to maintain a limited amount of information. For example, each node may only need to maintain a database of information for a limited number of nodes, namely the nodes inside its limited portion of the network. Furthermore, nodes only need to calculate paths (e.g. using the SPF algorithm) considering the nodes within its limited portion, rather than all the nodes of the network. This not only reduces the amount of memory required in each node for keeping such a database, but also decreases the SPF calculation time (Dijkstra run time). When the network portion is small enough, the SPF can be calculated almost in real time. However, for reliable routing, it is useful for each node to have the most up-to-date status for all the links in the limited portion of the network which that node sees. In some embodiments, to facilitate this, any event occurring with respect to any link or node is flooded to at least all the network nodes who would track status of this link or node in their database. That is, events in a given network location are communicated to those nodes which see that given network location as part of their limited portion of the network. This approach is expected to be simpler than network-wide flooding of status update messages, because the status update messages in response to a given event is limited to a fraction of the entire network. For instance if the network portion size is defined to be all nodes within n hops of a given node, any event (e.g. link/node failure or creation) may be required to be communicated to all network nodes within n hops of the event and not more. Notably, this reduces the complexity of control plane operations and also data plane operation as the forwarding table is small and can be looked up relatively quickly. The control plane operations can include, for example, flooding and updating network topologies at nodes, as well as updating the SPF computations and routing and forwarding tables.

Nodes in the network can be relatively stationary, or they may be mobile with respect to one another. For example, in a network involving satellite-based network nodes or terrestrial mobile network nodes, some or all nodes are relatively mobile. In response to motion of the nodes, the physical location information held by network nodes (relating to other nodes in their limited portion of the network) can change over time. This change can be in response to internally held schedules such as almanac or ephemeris data, or in response to external messages indicative of such location changes.

Figure 4:
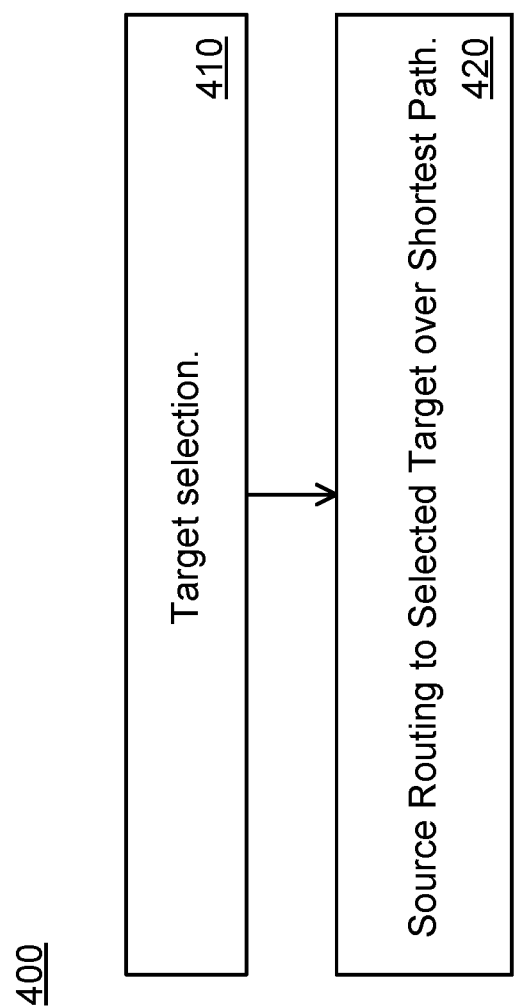
FIG. 4 illustrates a method for routing a data packet in a network, according to embodiments of the present invention.

FIG. 4 illustrates a routing method 400 having two main phases, according to an embodiment of the present invention. In the first phase, target selection 410 is performed. The target selection involves selecting a target node meeting an objective in terms of orthodromic distance, as described herein. The target node can be selected from a limited portion of the network being tracked by the node making the target selection. In the second phase, source routing 420 to the selected target over a shortest path is performed. In source routing, a path to the selected target, which may be direct (zero intermediate nodes) or which may include one or more intermediate nodes, is determined. The path belongs to the limited portion of the network and is located along an available network path between the node and the target node. The packet is forwarded toward the target node via the route. This can involve configuring the packet with a source routing header which the subsequent nodes handle according to a source routing and forwarding protocol.

Some potential advantages provided by certain embodiments of the present invention are as follows. The issue of scaling in broadband satellite networks is addressed, by requiring each node only to track a limited portion of the network. Distributed link-state protocols are enabled in large flat networks. By using distance as a cost metric, performance and routing are directly linked. Routing scope of individual network elements is reduced, without necessarily requiring gateway routers. The requirement to flood information through the network is mitigated. Shortest path calculations and associated data structures are reduced. Relatively robust routing may be provided for, particularly in high link failure regimes. Piece-wise traffic engineering is potentially supported, by defining segments between nodes and performing traffic engineering over each segment. Use of link-state protocols is enabled with modification combined with geographic coordinates to simplify routing. All nodes potentially operate in the same manner, although for any given packet, some nodes may perform next target node selection, while other nodes may simply act as intermediate forwarding nodes according to source routing. Only certain active routing nodes (e.g. target nodes or source node) perform routing operations, and only for limited segments of the network. Other (intermediate) nodes simply forward packets based on content of the SRH configured into the packet by the active routing nodes. Computation and storage requirements are also reduced, which is beneficial to deployments where resources are limited (e.g. in satellites and IoT devices).

Although embodiments of the present invention are described primarily with respect to routing in satellite mesh networks (e.g. having polar or walker delta or other constellation configurations), it should be appreciated that the present invention may also be applied in other network scenarios, such as in other geometric or geographic based routing systems not necessarily involving satellites, or in other non-geometric or non-geographic based routing systems, for example in which packets are routed solely based on network address (e.g. arranged by nested subnets) and network topology. Embodiments of the present invention can be applied to networks which are either topologically stable or which have dynamic or hyper dynamic network topology changes.

Embodiments of the present invention can be implemented using electronics hardware, software, or a combination thereof. In some embodiments, the forwarding plane is implemented by one or multiple computer processors executing program instructions stored in memory. In some embodiments, the forwarding plane is implemented partially or fully in hardware, for example using one or more field programmable gate arrays (FPGAs) or application specific integrated circuits (ASICs) to rapidly perform the processing operations required for implementing forwarding plane operations. The forwarding plane operations can include determining costs or utilities (e.g. distances or approximate distances) associated with forwarding data packets to destination devices, determining subsets of destination devices having lowest costs or highest utilities, selecting one of the destination devices, and forwarding of a data packet to the selected destination device.

Figure 5:
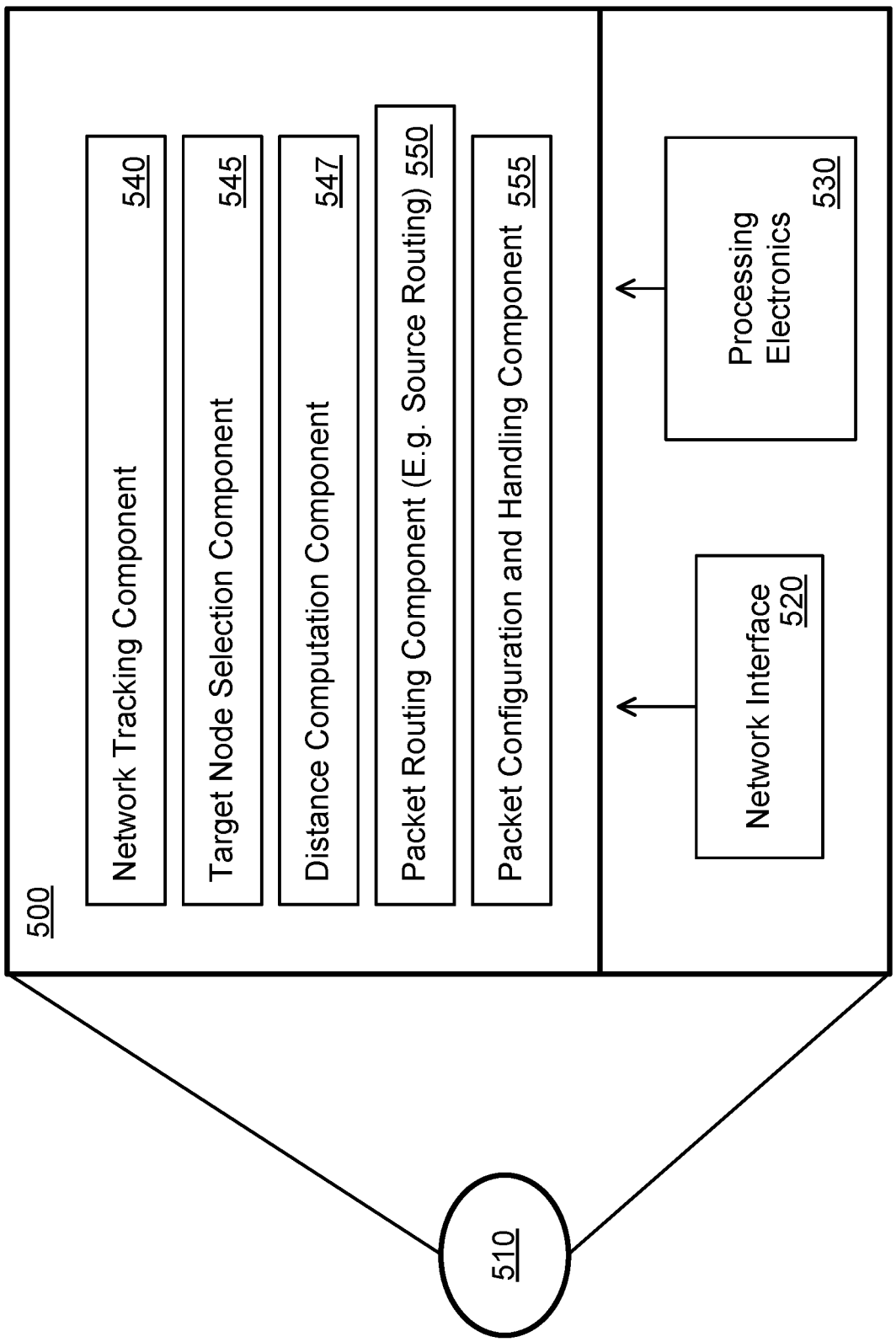
FIG. 5 illustrates an apparatus for routing data packets in a network, according to embodiments of the present invention.

FIG. 5 illustrates an apparatus 500 for routing data packets in a network, according to embodiments of the present invention. The apparatus is located at a node 510 of the network in possession of the data packet, such as but not necessarily limited to a satellite-based node. The apparatus includes a network interface 520 and processing electronics 530. The processing electronics can include a computer processor executing program instructions stored in memory, or other electronics components such as digital circuitry, including for example FPGAs and ASICs. The network interface can include an optical communication interface or radio communication interface, such as a transmitter and receiver. The apparatus can include several functional components, each of which is partially or fully implemented using the underlying network interface 520 and processing electronics 530.

The apparatus includes a network tracking component 540 which is configured to maintain current information regarding a limited portion of the network directly coupled to the node 510. The information can include physical location information for nodes in the limited portion of the network, and routing information for the limited portion of the network. The information can be maintained through receiving and processing control plane messages indicative of current network conditions, through predicting changes in network conditions based on internal models, or a combination thereof. The apparatus includes a target node selection component 545. The target node selection component is configured to select, from among the nodes in the limited portion of the network, a target node that meets a given objective with respect to orthodromic distance to the physical location of the destination for the data packet. This may involve selecting the target node as the node which is closest to the packet destination location, or selecting the target location from among the k nodes which are closest to the packet destination location. The target node selection component may further be configured to omit, from the set of nodes being considered as potential next target nodes, the nodes listed in the previously visited targets header (as the header is received by the target node). This aspect of the target node selection component can be referred to as a loop suppression component.

The apparatus may include a distance computation component 547, which may be part of the target node selection component 545 or a separate component coupled thereto. The distance computation component is configured to determine orthodromic distances or approximate orthodromic distances between pairs of network nodes, or between network nodes and packet destination locations, or between geographic coordinates.

The apparatus further includes a packet routing component 550 which is configured to determine, based on the routing information, a route through the limited portion of the network and located along an available network path between the node and the target node. The route can be determined based on a routing table, which selects the route based on the target node. The routing table can be maintained by the network tracking component 540, based on the current network information. For this purpose, for example, the network tracking component can maintain the routing table in accordance with a shortest path first algorithm, which determines shortest paths to potential target nodes, and associates these with appropriate nodes along respective shortest paths to target nodes.

The apparatus further includes a packet configuration and handling component 555 which is configured to forward the packet toward the next node using the network interface 520. The packet configuration and handling component may be implemented as a collection of separate components. The packet configuration and handling component may operate differently based on the header contents of a received packet. For example, when the packet includes a SRH specifying one or more nodes other than the node 510 at which the apparatus 500 resides, the packet configuration and handling component 555 may be configured to remove its own identifier from the SRH (or else update an index field pointing to the next active part of the SRH) and forward the packet onward to the next node identified in the SRH. In this case, the other components of the apparatus are not necessarily specifically engaged with respect to this particular packet.

When the packet is newly generated, or does not include a SRH specifying one or more nodes other than the node 510, the packet configuration and handling component 555 may be configured to engage the target node selection component 545 to select a new target node for forwarding the packet toward, and to engage the packet routing component 550 to determine a route to the selected new target node. Additionally, the packet configuration and handling component is configured to encode the determined route into the packet, for example as a sequence of one or more identifiers of nodes to be visited along the route. Additionally, the packet configuration and handling component is configured to append its own identifier to the previously visited targets header of the packet. The packet configuration and handling component is further configured to perform packet forwarding, to the next node along the source route, using the network interface. In some embodiments, rather than implementing source routing, the packet routing component 550 can alternatively be configured to operate according to alternative routing operations, as will be described below.

Alternatives to source routing embodiments will now be described. In one embodiment, each node is configured to maintain a copy of the routing tables (and possibly also tables of physical location information) for every other node in a particular region. For a given node, this region consists of all nodes which could potentially act as a first node with the given node being an intermediate node for a packet being transmitted toward a target node. In other words, whenever a node could act as an intermediate node for a packet originating from a source node, that node will preferably be provided with a copy of the routing table (or equivalent information) of that source node. Likewise, the node may be provided with a copy of the table of physical location information for other nodes, as kept by that source node. This can be achieved for example by each node identifying all the potential target nodes in its region, and periodically transmitting copies of its routing table (and possibly physical location information table) toward the target nodes with instructions causing intermediate nodes to update its local copy of the source node's routing table using the contents of the transmission. Subsequently, when a packet is received at an intermediate node, that intermediate node identifies the originating source node based on header information, and uses its copy of that source node's routing table to determine the next node to forward the packet to. (For this purpose, an identifier of the source node is included, by the source node, in the packet.) Because, for a given packet, the same routing table is used by all intermediate nodes, the routing is consistent with what the source node would have selected, for example had explicit source routing been used. As such, the network nodes are configured to cause the packet to traverse a particular route to the target node, where this route is determined by the source node. Once the target node is reached, the target node becomes the new source node and the process repeats. However, with this method, each intermediate node maintains multiple routing tables and switches between them based on header information, which may potentially increase complexity and memory requirements. This complexity increase may be offset by some cases by the reduction in header size that would otherwise be required for explicit source routing.

Rather than maintaining routing tables, each node can maintain a representation of a network topology graph for other nodes. The topology graph for a given node specifies the local network topology as seen by that given node, including the existence of nodes in a corresponding limited portion of the network, available communication links between these nodes, and possibly also parameters of these communication links and/or physical location information for those nodes. Routing tables can be generated based on the topology graphs.

In other words, in relation to the above, a first node configuring a set of nodes to cause the packet to traverse a determined route to the target node is carried as follows. The first node transmits its the routing information (e.g. routing tables) for the limited portion 330 of the network to each of the set of nodes. The routing information indicates current link availability, from a limited perspective of the first node, between all pairs of nodes in the limited portion 330 of the network as seen by the first node. Each node of the set of nodes is further configured to determine the route for the packet by making a routing decision based on this routing information provided by the first node. In some embodiments, configuring the set of nodes includes explicitly informing each of the set of nodes of the target node, for example by including a designation of the target node in the packet (e.g. in a packet header) or in a separate control message. Each node then determines the route toward the target node. If such a route cannot be found, a new target node is selected by the node currently in possession of the packet.

In some embodiments, as mentioned above, configuring the set of nodes comprises, by the first node, transmitting the physical location information table (as seen by the first node) to each node of the set of nodes. As such, each node may have a copy of the physical location information table for the first node. Subsequently, each node, if it receives the packet, is configured to select the target node based on this received physical location information table. This is performed by identifying the first node based on information written into the packet (e.g. in the packet header) and then consulting the physical location information table corresponding to that packet. Multiple physical location information tables corresponding to multiple source nodes can be held by each intermediate node. Because the physical location information is the same, the same target node will be selected by each node which receives the packet after initial target node selection. Thus, the set of nodes of the network are configured to cause the packet to traverse the determined route to the target node.

Figure 6A:
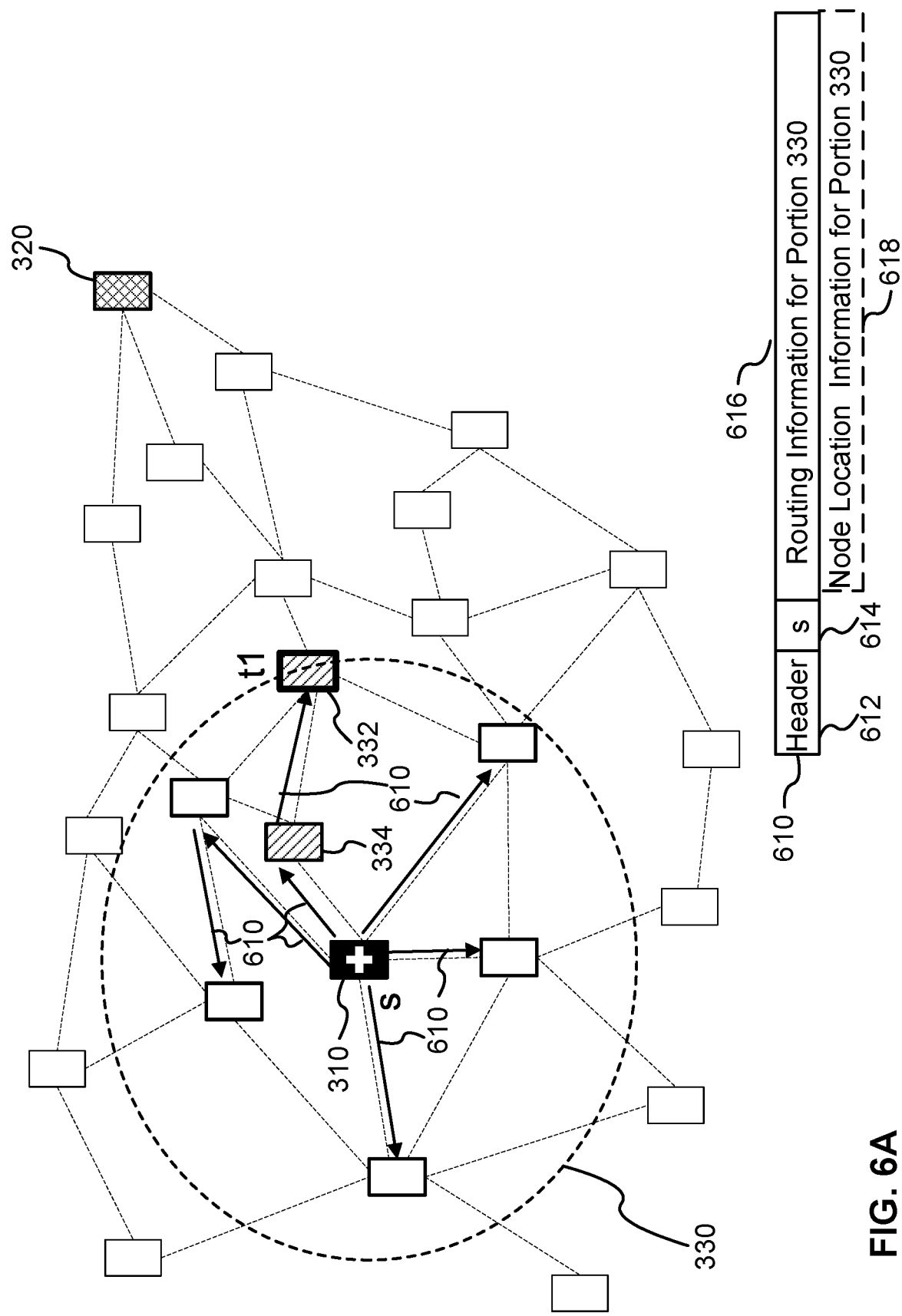
FIGS. 6A and 6B illustrate packet routing operations according to an alternative embodiment of the present invention, in which nodes share routing information prior to forwarding packets.
Figure 6B:
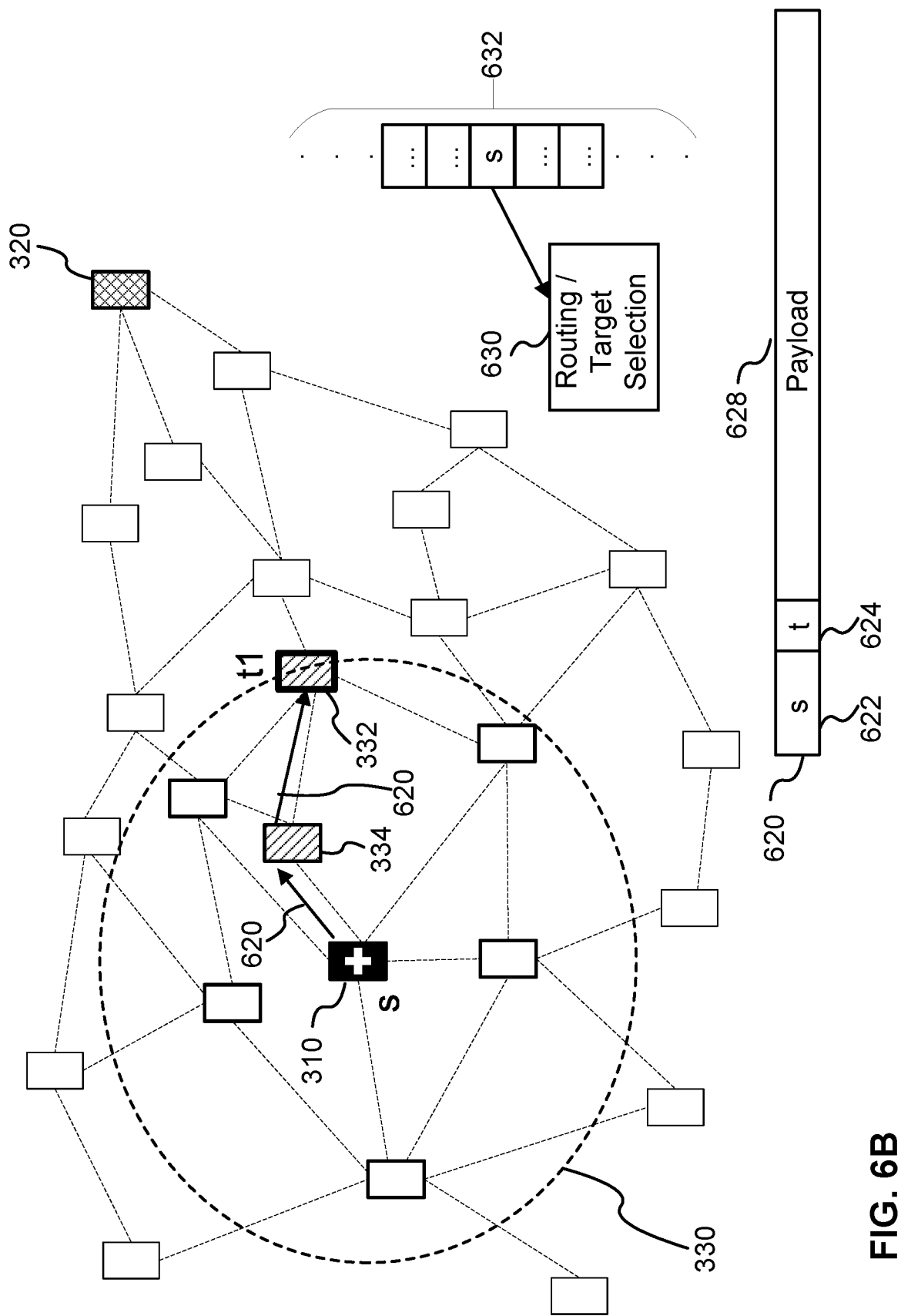

FIGS. 6A and 6B illustrate an example of the above-described embodiment. In FIG. 6A, a source node 310 transmits a control message 610 to all other nodes within the limited portion 330 of the network. The control message can be transmitted via a limited flooding protocol, for example. The control message includes a header 612 indicating the nature of the control message, an identifier 614 of the source node 310, and routing information 616 for the limited portion 330 of the network. The routing information is the information which is seen by the source node 310, and may include a routing table, an indication of a local network topology graph, etc. The control message may further include physical location information 618 for nodes in the limited portion 330 of the network. This physical location information can be used, if necessary, to perform (or re-perform) target selection by other nodes in a manner that is consistent with the target selection that would be performed by the source node 310. Every node can perform this type of control message transmission.

In FIG. 6B, the source node 310 transmits a packet 620 to a next (intermediate) node 334. It is assumed that the source had previously determined target node 332 as being suitable for conveying the packet toward the destination 320. The packet 620 includes an identifier 622 of the source node 310, and an identifier 624 of the target node 332, as well as a payload 628. Although not shown explicitly, the packet may also include a previously visited target header which operates as described previously.

When the intermediate node 334 receives the packet 620, it identifies the source node using field 622. The intermediate node then performs routing operations (and optionally also target node selection) 630 based on the source node identified in field 622. In particular, the intermediate node 334 holds a database of routing information (and optionally also physical location information) 632 that has been received from a plurality of nodes, including the source node "s" 310. This information from each particular node is received as described with respect to FIG. 3A and is information from the limited perspective of the node that it was received from. The information for the source node 310 is provided from the database for use in a routing (and optionally also target selection) operation 630. Thus, the intermediate node 334 performs routing of the packet based (and optionally also target selection) based on the information corresponding to the source node 310, as retrieved from its database.

In one embodiment, the node location information 618 may be included as in FIG. 6A, and the identifier 624 of the target node may be omitted. In this case, the intermediate node 334 also performs target selection in a manner similarly to the source node, but using the node location information 618 corresponding to the source node. As such, the same target node 332 will be selected by the intermediate node 334. The intermediate node selects the node location information 618 for use in target node selection in a similar manner to how the routing information was selected, as already described above.

Subsequently, the intermediate node forwards the packet 620 onward toward the target node 332. The header information of the packet may remain the same until the target node is reached. This mitigates the need to update the packet at every intermediate node.

In an alternative embodiment, source routing is not used, and neither is the sharing of topology graphs or associated routing tables between nodes. Rather, only the designated target node is shared. The currently designated target node can be included in the packet, for example in a target node header. For example, the previously visited targets header 374 of FIGS. 3B to 3D can be augmented to also designate the current target, which is flagged as being a current target not to be considered as a previously visited target for purposes of the anti-loop scheme. The source routing header 372 is omitted in this embodiment.

Figure 7:
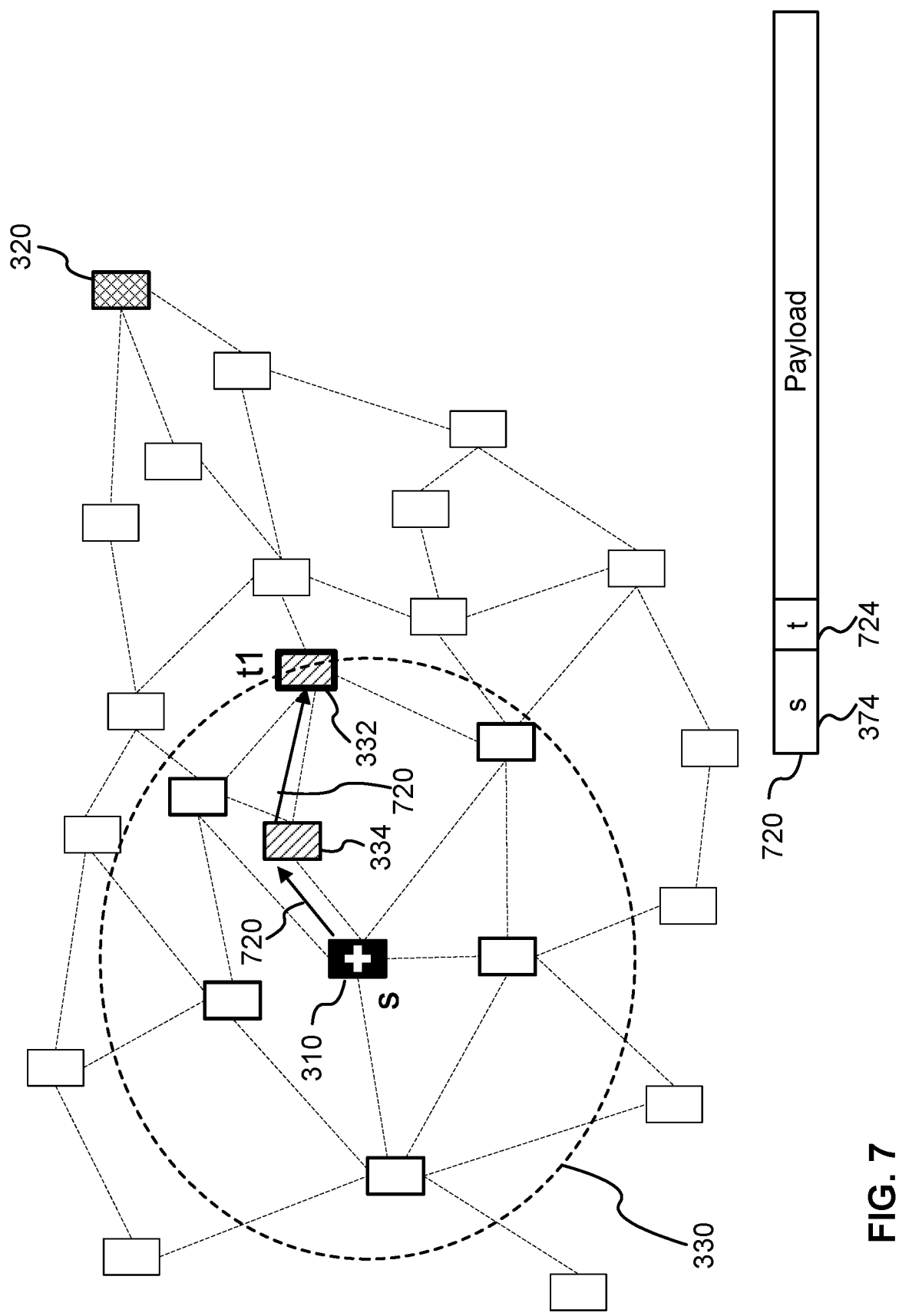
FIG. 7 illustrates packet routing operations according to another alternative embodiment of the present invention, in which target node information but not routing information is shared between nodes.

In this alternative embodiment, having regard to FIG. 7, a first node 310 maintains physical location information and routing information for a limited portion 330 of the network and selects a target node 332 proximate to the destination 320 as described elsewhere herein. Then, the first node 310 determines, based on the routing information, a next node 334 belonging to the limited portion 330 of the network and located along an available network path between the first node 310 and the target node 332. The network path may be determined by the first node. The first node configures the next node 334 to preferentially forward the packet 720 toward the target node. This may be done by including a designation of the current target node in the packet header in a field 724, as described above (thus the configuration and forwarding may be done concurrently). The first node forwards the packet 720 toward the next node 334, which is typically directly coupled to the first node via a communication link.

The next node 334, in receipt of the packet 720, and seeing that a target node 332 has already been designated in the packet in field 724, attempts to route the packet toward the target node 332 based on its own locally maintained routing information. This routing information may be routing information for a limited portion of the network as seen by the next node 334 (which is not necessarily the same as the routing information for the limited portion 330 as seen by the source node 310). Thus, the route to the target node as determined by the next node 334 may potentially differ from the route to the target as determined by the source node 310. However, the target node 332 remains the same. If the next node 334 cannot determine a route to the target node 332, it may operate as an active routing node and select a new target node. The next node then forwards the packet on to a further next node which is on a path to the target node (or as in this case, directly to the target node 332), and the process continues. Optionally, the packet 720 can include a previously visited target header 374 as described previously.

It is noted that, in the above scenarios, if a node is unable to route the packet to the preferred or designated target node (as identified by the first node), for example due to a failed link, the node can perform target node reselection.

Embodiments of the present invention operate by using source routing (or an alternative) when forwarding a packet to the target node. Each node maintains its own local link state data base (LSDB) and only active routing nodes insert the entire path to the current target node into the SRH. Because the path length is limited by the size of the limited portion of the network seen by an active routing node, a packet traversing larger portions of the network follows multiple segments, each defined by an active routing node such as a target node in receipt of the packet. As such, piece-wise traffic engineering can be implemented. The traffic engineering is applied on the scale of the segments defined between target nodes. This differs from end-to-end traffic engineering, which is applied unitarily to the entire path between packet source and destination.

In more detail, traffic engineering can refer to performing packet handling operations, such as target node selection and configuration of the route to the target node, based on rules which are designed to control network conditions when applied to large numbers of packets. For example, different packets can be routed along different paths in order to balance loads among the different paths. Different paths may involve different target nodes, different routes to target nodes, or a combination thereof. In some cases, multiple alternative target nodes may be identified which are relatively close to the packet destination. One of these alternative target nodes may be selected based at least in part on traffic engineering or QoS criteria. Some paths may be associated with a particular quality of service (QoS), for example a particular delay or jitter level. These paths can be used to handle packets with certain QoS requirements. A packet can be assigned to a path based on its QoS requirements, traffic engineering requirements, current network conditions, or a combination thereof.

Although end-to-end traffic engineering is not necessarily possible in various embodiments of the invention, piece-wise traffic engineering may be performed as a way of approximating such end-to-end traffic engineering from the source to the destination. By traffic engineering, a node may be able to control the flow quality of service (QoS) in its region and provide for load balancing, latency control, congestion control, etc. only in its region. Piece-wise traffic engineering achieves this by causing active routing nodes to select their next target node, the path to the next target node, or a combination thereof, based on requirements such as QoS requirements and network load balancing requirements. Because source routing (or an alternative) is employed, packets are substantially guaranteed to reach a target node once it is selected (rather than the target node changing in response to routing decisions made by intermediate nodes). This allows traffic engineering to be more reliably performed because selected routes to target nodes are consistently used.

A node can select its target node based at least in part to satisfy one or more traffic engineering conditions. This may correspond to selecting a traffic engineering segment occurring between nodes. The traffic engineering segments can be managed, for example to attempt to preserve certain QoS conditions.

Figure 8:
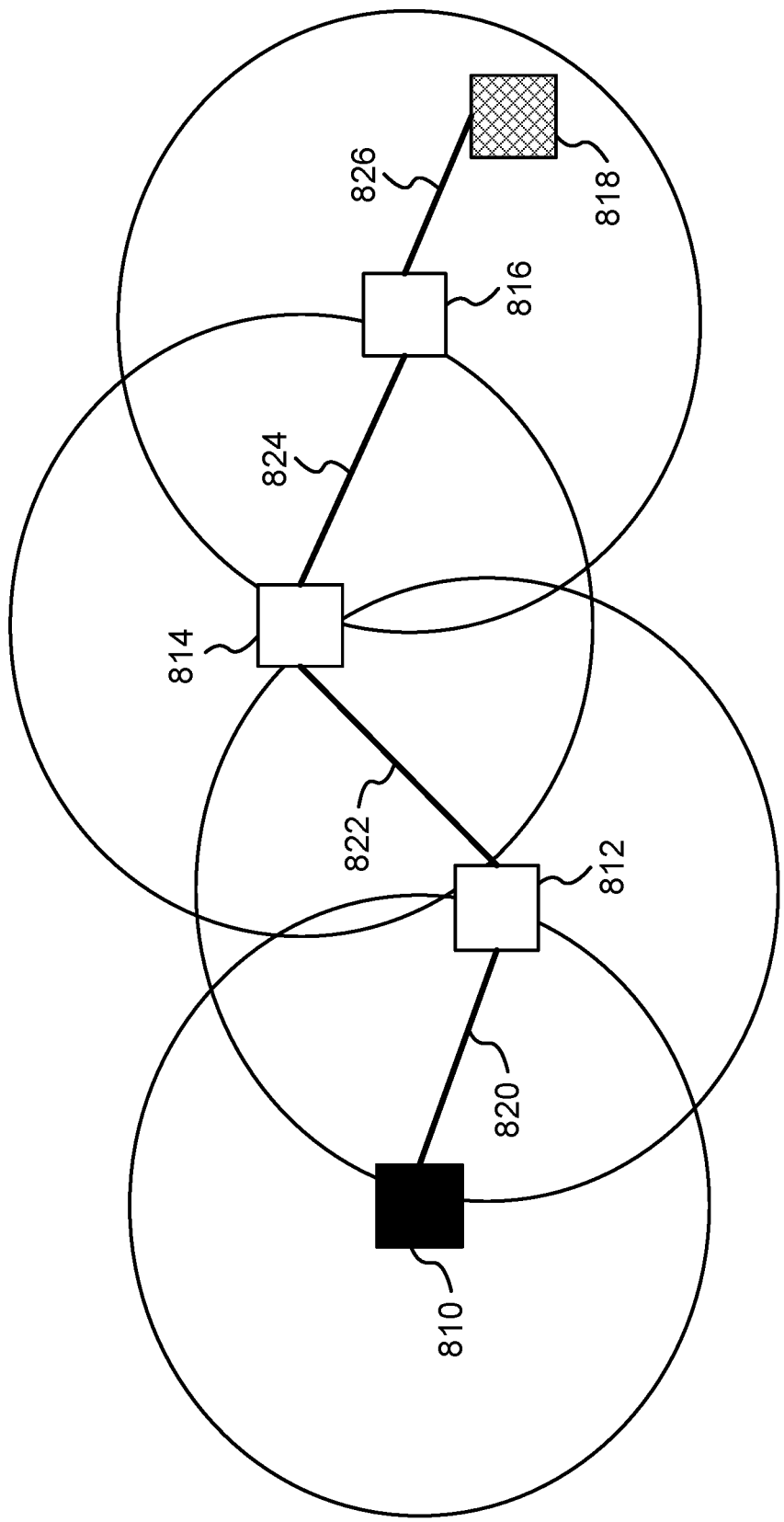
FIG. 8 illustrates a multi-segment portion of a network, upon which traffic engineering may be performed, according to embodiments of the present invention.

FIG. 8 illustrates multiple traffic engineering (TE) segments 820, 822, 824, 826 defined between respective network nodes 810, 812, 814, 816, 818, according to an example embodiment of the present invention. Node 810 can designate node 812 as a target, node 812 can designate node 814 as a target, node 814 can designate node 816 as a target, and node 816 can designate node 818 as a target. The TE segments can be managed by a traffic engineering management component operating in the network, for example in a control plane or management plane.

Figure 9:
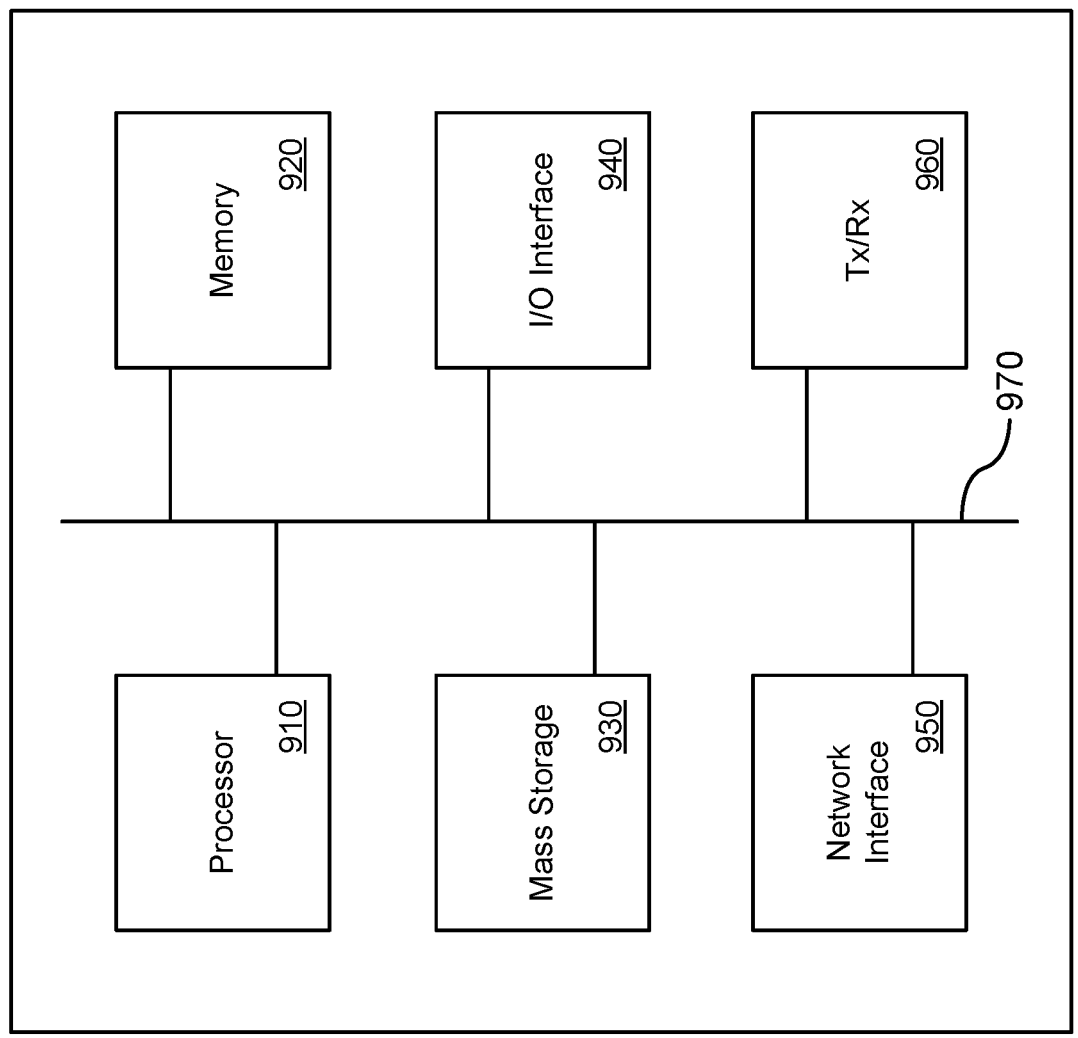
FIG. 9 is a schematic diagram of an electronic device that may perform any or all of operations of the above methods and features explicitly or implicitly described herein, according to different embodiments of the present invention.

FIG. 9 is a schematic diagram of an electronic device 900 that may perform any or all of operations of the above methods and features explicitly or implicitly described herein, according to different embodiments of the present invention. For example, a computer equipped with network function may be configured as electronic device 900. The electronic device 900 may be used to implement the apparatus 500 of FIG. 5, for example.

As shown, the device includes a processor 910, such as a Central Processing Unit (CPU) or specialized processors such as a Graphics Processing Unit (GPU) or other such processor unit, memory 920, non-transitory mass storage 930, I/O interface 940, network interface 950, and a transceiver 960, all of which are communicatively coupled via bi-directional bus 970. According to certain embodiments, any or all of the depicted elements may be utilized, or only a subset of the elements. Further, the device 900 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 920 may include any type of non-transitory memory such as static random access memory (SRAM), dynamic random access memory (DRAM), synchronous DRAM (SDRAM), read-only memory (ROM), any combination of such, or the like. The mass storage element 930 may include any type of non-transitory storage device, such as a solid state drive, hard disk drive, a magnetic disk drive, an optical disk drive, USB drive, or any computer program product configured to store data and machine executable program code. According to certain embodiments, the memory 920 or mass storage 930 may have recorded thereon statements and instructions executable by the processor 910 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

As will be well understood, the above disclosure teaches a method for routing a data packet in a network, the data packet specifying a physical location of a destination for the data packet, the method comprising, at a first node of the network in possession of the data packet. This method comprises maintaining physical location information for nodes in a limited portion of the network directly coupled to the first node, and maintaining routing information for the limited portion of the network, said limited portion of the network comprising at least one node which is indirectly coupled to the node via at least one intermediate node; selecting, from among the nodes in the limited portion of the network, a target node that meets a predetermined objective with respect to orthodromic distance to the physical location of the destination for the data packet, the target node not being an immediate neighbor to the first node; determining, based on the routing information, a next node belonging to the limited portion of the network and located along an available network path between the first node and the target node; configuring the next node to preferentially forward the packet toward the target node; and forwarding the packet toward said next node. In one embodiment, configuring the next node to preferentially forward the packet toward the target node comprises configuring the packet to carry an identifier of the target node, wherein the next node is configured to route the packet toward the target node when the next node is capable of determining a route to the target node based on routing information held by the next node.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for routing a data packet in a network, the data packet specifying a physical location of a destination for the data packet, the method comprising, at a first node of the network in possession of the data packet:
   maintaining physical location information for nodes of the network in a limited portion of the network, the limited portion of the network being directly coupled to the first node, and maintaining routing information for the limited portion of the network, said limited portion of the network comprising at least one node of the network which is indirectly coupled to the first node via at least one intermediate node;
   selecting, from among the nodes of the network in the limited portion of the network, a target node for the data packet that meets a predetermined objective with respect to orthodromic distance to the physical location of the destination for the data packet;
   determining, based on the routing information, a route through the limited portion of the network from the first node to the target node, the route including a set of the nodes in the limited portion to be traversed in turn by the data packet, the set of the nodes comprising at least the target node;
   configuring a set of nodes of the network to cause the packet to traverse the determined route to the target node,
      wherein configuring the set of nodes comprises configuring the data packet using source routing to include source routing information,
      wherein the source routing information specifies each node of the set of nodes included in the route to be traversed in turn by the data packet each node of the set of nodes configured for routing the data packet to the target node using source routing; and
   transmitting the data packet to a first node in the set of nodes based on the source routing information for forwarding of the data packet toward said target node.

2. The method of claim 1, wherein the set of nodes included in the route comprises one or more further intermediate nodes between the first node and the target node.

3. The method of claim 1, wherein the target node is at an edge of the limited portion of the network.

4. The method of claim 1, wherein the routing information indicates current link availability, from a limited perspective of the first node, between all pairs of the nodes in the limited portion of the network.

5. The method of claim 4, wherein configuring the data packet comprises configuring the data packet to include a designation of the target node.

6. The method of claim 1, wherein the data packet includes an identifier of the first node as part of a list of target nodes previously visited by the data packet, and wherein selecting the target node comprises avoiding selecting the target node to be any node included in the list of target nodes previously visited by the data packet.

7. The method of claim 1, wherein selecting the target node is performed based at least in part to satisfy one or more traffic engineering conditions.

8. The method of claim 1, further comprising determining respective orthodromic distances or approximations thereof between at least some of the nodes in the limited portion of the network and the physical location of the destination for the data packet.

9. The method of claim 1, wherein the routing information comprises a routing table which is maintained based on one or both of: dynamic updates of status of communication links between the nodes in the limited portion of the network; and dynamic changes to a topology of the network.

10. The method of claim 1, wherein the physical location of the destination for the data packet specifies a latitude and a longitude of the destination for the data packet, coordinates of the destination for the data packet in a polar coordinate system, or coordinates of the destination for the data packet in a Cartesian coordinate system.

11. The method of claim 1, wherein the limited portion of the network comprises one or more of: all nodes of the network which are within a predetermined number of hops from the first node, said predetermined number being greater than one; all nodes of the network which are within a predetermined distance of the first node; and all nodes which are in a predetermined spatial region containing or adjacent to the first node.

12. The method of claim 11, wherein the predetermined number, the predetermined distance or the predetermined spatial region is determined based on link outage characteristics of the network.

13. The method of claim 1, wherein said physical location information for the nodes of the network in the limited portion of the network changes over time in response to motion of said nodes of the network.

14. The method of claim 1, wherein some or all of the nodes in the limited portion of the network are satellite-based network nodes.

15. The method of claim 1, further comprising selecting the target node from among a plurality of candidate target nodes, the plurality of candidate target nodes being nodes in the limited portion of the network which meet the predetermined objective.

16. The method of claim 15, wherein the predetermined objective specifies that a node in the limited portion of the network is one of the candidate target nodes when said node is among k nodes in the limited portion of the network which are closest, with respect to orthodromic distance, to the physical location of the destination for the data packet.

17. The method of claim 1, wherein the predetermined objective specifies that the target node is closest in orthodromic distance, among all the nodes in the limited portion of the network, to the physical location of the destination for the data packet.

18. A method for routing a data packet in a network, the data packet specifying a physical location of a destination for the data packet, the method comprising, at each node of a plurality of nodes of the network, when in possession of the data packet:
   maintaining physical location information for respective nodes of the network in a limited portion of the network, the limited portion of the network being directly coupled to the node, and routing information for the limited portion of the network, said limited portion of the network comprising at least one node of the network which is indirectly coupled to the node via at least one intermediate node;

selecting, from among the nodes of the network in the limited portion of the network, a target node for the data packet that meets a predetermined objective with respect to orthodromic distance to the physical location of the destination for the data packet;

determining, based on the routing information, a route through the limited portion of the network from the node to the target node, the route including a set of the nodes in the limited portion to be traversed in turn by the data packet, the set of the nodes comprising at least the target node;

configuring a set of nodes of the network to cause the packet to traverse the determined route to the target node, wherein configuring the set of nodes comprises configuring the data packet using source routing to include source routing information,; and wherein the source routing information specifies each node of the set of nodes included in the route to be traversed in turn by the data packet each node of the set of nodes configured for routing the data packet to the target node using source routing; and transmitting the data packet to a first node in the set of nodes based on the source routing information for forwarding of the data packet toward said target node.

19. The method of claim 18, wherein the set of nodes included in the route comprises a further intermediate node, the method further comprising, upon receipt of the packet by the further intermediate node, forwarding the packet toward the target node along the determined route.

20. An apparatus for routing a data packet in a network, the data packet specifying a physical location of a destination for the data packet, the apparatus located at a first node of the network in possession of the data packet, the apparatus comprising a network interface and processing electronics and configured to:

maintain physical location information for nodes of the network in a limited portion of the network, the limited portion of the network being directly coupled to the first node, and maintain routing information for the limited portion of the network, said limited portion of the network comprising at least one node of the network which is indirectly coupled to the first node via at least one intermediate node;

select, from among the nodes of the network in the limited portion of the network, a target node for the data packet that meets a predetermined objective with respect to orthodromic distance to the physical location of the destination for the data packet;

determine, based on the routing information, a route through the limited portion of the network from the first node to the target node, the route including a set of the nodes in the limited portion to be traversed in turn by the data packet, the set of the nodes comprising at least the target node;

wherein configuring the set of nodes comprises configuring the data packet using source routing to include source routing information; and wherein the source routing information specifies each node of the set of nodes included in the route to be traversed in turn by the data packet each node of the set of nodes configured for routing the data packet to the target node using source routing; and transmit the data packet to a first node in the set of nodes based on the source routing information for forwarding of the data packet toward said target node.

21. The apparatus of claim 20, wherein the source routing information specifies one or more further intermediate nodes to be traversed in turn by the packet, the further intermediate nodes defining the determined route from the first node to the target node.

22. An apparatus for routing a data packet in a network, the data packet specifying a physical location of a destination for the data packet, the apparatus located at a first node of the network in possession of the data packet, the apparatus comprising a network interface and processing electronics and configured to:

maintain physical location information for nodes of the network in a limited portion of the network, the limited portion of the network being directly coupled to the first node, and maintain routing information for the limited portion of the network, said limited portion of the network comprising at least one node of the network which is indirectly coupled to the node via at least one intermediate node;

select, from among the nodes of the network in the limited portion of the network, a target node for the data packet that meets a predetermined objective with respect to orthodromic distance to the physical location of the destination for the data packet;

determine, based on the routing information, a next node belonging to the limited portion of the network and located along an available network path between the first node and the target node;

configure the next node to preferentially forward the packet toward the target node, said configuring comprising including a designation of the target node in the packet, said target node selected from among nodes of the limited portion of the network and said target node proximate to the destination; and forward the packet toward said next node.

\* \* \* \* \*